(12) United States Patent  (10) Patent No.: US 7,658,251 B2
James  (45) Date of Patent: Feb. 9, 2010

(54) DIRECT DRIVE ELECTRIC TRACTION MOTOR

(76) Inventor: Harry K. James, P.O. Box 2324, Orange, CA (US) 92859

( * ) Notice: Subject to any disclaimer, the term of this patent is extended or adjusted under 35 U.S.C. 154(b) by 423 days.

(21) Appl. No.: 11/533,726

(22) Filed: Sep. 20, 2006

(65) Prior Publication Data

US 2008/0066980 A1   Mar. 20, 2008

(51) Int. Cl.
B60K 1/00 (2006.01)

(52) U.S. Cl. ............... 180/65.51; 310/67 R; 310/75 R

(58) Field of Classification Search .......... 180/65.5, 180/65.51; 310/67 R, 75 C, 75 D, 75 R
See application file for complete search history.

(56) References Cited

U.S. PATENT DOCUMENTS

| | | | |
|---|---|---|---|
| 2,588,889 A | | 3/1952 | Sherwood |
| 2,916,642 A | | 12/1959 | Macks |
| 3,090,878 A | | 5/1963 | Karlby et al. |
| 3,462,667 A | | 8/1969 | Jackson |
| 4,021,690 A | * | 5/1977 | Burton ............... 310/67 R |
| 4,115,915 A | | 9/1978 | Godfrey |
| 4,223,255 A | | 9/1980 | Goldman et al. |
| 4,571,822 A | | 2/1986 | Saito et al. |
| 4,798,260 A | | 1/1989 | Nakata et al. |
| 4,913,258 A | | 4/1990 | Sakurai et al. |
| 5,087,229 A | | 2/1992 | Hewko et al. |
| 5,156,579 A | | 10/1992 | Wakuta et al. |
| 5,163,528 A | | 11/1992 | Kawamoto et al. |
| 5,180,180 A | | 1/1993 | Yamashita et al. |
| 5,355,039 A | | 10/1994 | Couture |
| 5,382,854 A | | 1/1995 | Kawamoto et al. |
| 5,438,228 A | | 8/1995 | Couture et al. |
| 5,549,172 A | | 8/1996 | Mutoh et al. |
| 5,691,584 A | * | 11/1997 | Toida et al. ............ 310/67 R |
| 5,894,902 A | * | 4/1999 | Cho ................... 180/65.51 |
| 6,148,945 A | | 11/2000 | Alessandro et al. |
| 6,341,660 B1 | | 1/2002 | Schiller |
| 6,768,932 B2 | | 7/2004 | Claypole et al. |
| 6,849,984 B2 | * | 2/2005 | Gallant ................. 310/178 |
| 6,851,496 B2 | | 2/2005 | Prucher |

(Continued)

FOREIGN PATENT DOCUMENTS

DE    10121372 A1    7/2002

(Continued)

OTHER PUBLICATIONS

PCT /US2007/019993 Invitation to Pay Additional Fees and Partial International Search.

(Continued)

Primary Examiner—Lesley Morris
Assistant Examiner—John D Walters
(74) Attorney, Agent, or Firm—Larry K. Roberts

(57) ABSTRACT

A direct drive traction vehicle motor system for a wheeled vehicle includes an electric motor rotor for mechanically attachment to a vehicle wheel for rotational movement with the vehicle wheel. An attachment structure is concentrically mounting the rotor to the vehicle wheel. An electric motor stator is mounted in a concentric relationship with the rotor. A mechanical structure is coupled between the vehicle and the stator for inhibiting rotation of the stator. An electric drive circuit is electrically coupled to the motor stator for exciting the motor stator to impart a rotational force on the vehicle wheel through the rotor.

36 Claims, 15 Drawing Sheets

U.S. PATENT DOCUMENTS

| | | | |
|---|---|---|---|
| 6,910,332 | B2 | 6/2005 | Fellows |
| 6,942,049 | B2 | 9/2005 | Shimizu |
| 6,948,578 | B2 | 9/2005 | Prucher |
| 7,245,052 | B2 * | 7/2007 | Stubner .................. 310/77 |
| 7,262,536 | B2 * | 8/2007 | Rahman et al. ........ 310/156.35 |
| 7,445,067 | B2 * | 11/2008 | Marsh et al. ............ 180/65.51 |
| 2003/0010550 | A1 | 1/2003 | Prucher |
| 2003/0047363 | A1 | 3/2003 | Makuta et al. |
| 2003/0146029 | A1 | 8/2003 | Heinen |
| 2004/0099455 | A1 | 5/2004 | Nagaya |
| 2004/0212259 | A1 | 10/2004 | Gould |
| 2005/0045392 | A1 | 3/2005 | Maslov et al. |
| 2005/0056471 | A1 | 3/2005 | Kurata |
| 2005/0104470 | A1 | 5/2005 | Perkins et al. |
| 2005/0257971 | A1 | 11/2005 | Kakinami et al. |
| 2008/0202832 | A1 * | 8/2008 | Ai ............................ 180/65.5 |

FOREIGN PATENT DOCUMENTS

| | | |
|---|---|---|
| DE | 101 32 610 A1 | 2/2003 |
| EP | 0331 180 A1 | 2/1989 |
| EP | 0 492 290 A | 1/1992 |
| EP | 1362736 A1 | 11/2003 |
| EP | 1380459 A1 | 1/2004 |
| EP | 1547843 A1 | 6/2005 |
| EP | 1547844 A1 | 6/2005 |
| EP | 1600324 A1 | 11/2005 |
| GB | 2369503 A | 5/2002 |
| JP | 10086884 | 4/1998 |
| WO | WO 92/18344 | 10/1992 |
| WO | WO 02/087914 A1 | 11/2002 |
| WO | WO 02/094603 A2 | 11/2002 |
| WO | WO 03/092142 A1 | 11/2003 |

OTHER PUBLICATIONS

PCT /US2007/019993 Transmittal of International Seach Report and Written Opinion of the ISA.

Rex Miller and Mark Richard Miller, Electric Motors: 6th Edition, Wiley Publishing, Inc., Chapter 8, pp. 173-183, 198-199, 2004.

Ron Hodkinson and John Fenton, Lightweight Electric/Hybrid Vehicle Design, SAE International, p. 18, 2001.

Anthony J. Pansini, Basics of Electric Motors, PennWell Publishing Company, pp. 54-55, 1996.

Walter N. Alerich and Jeff Keljik, Electricity 4, Motors, Controls, Alternators, Fifth Edition, Del Mar Publishers Inc., pp. 151-154, 1991.

* cited by examiner

FIG. 1
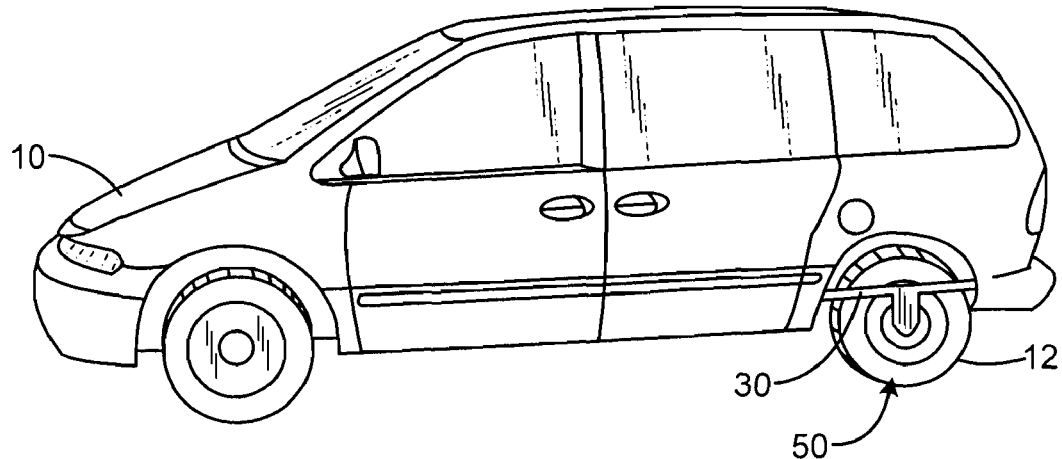
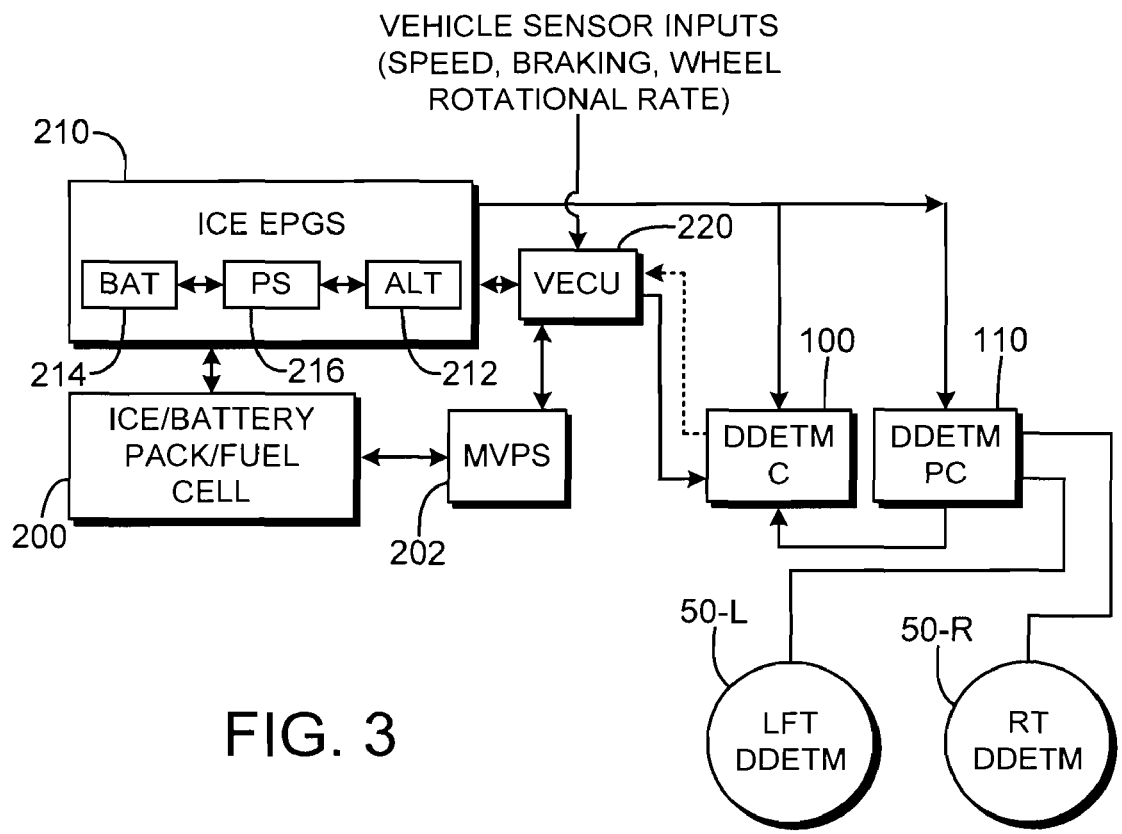
FIG. 3

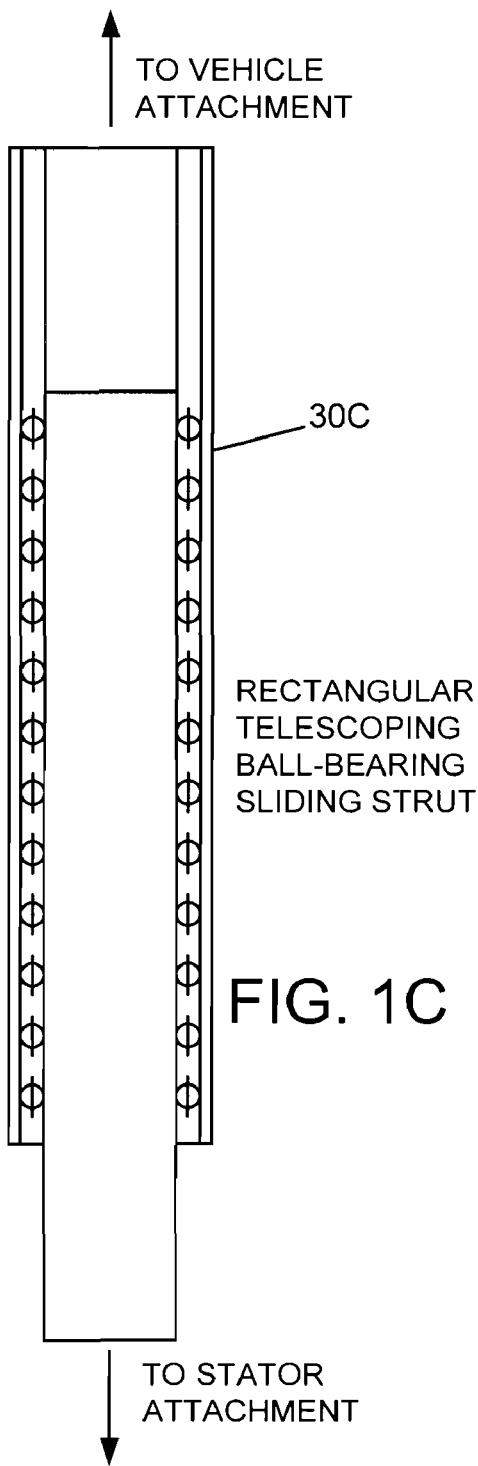
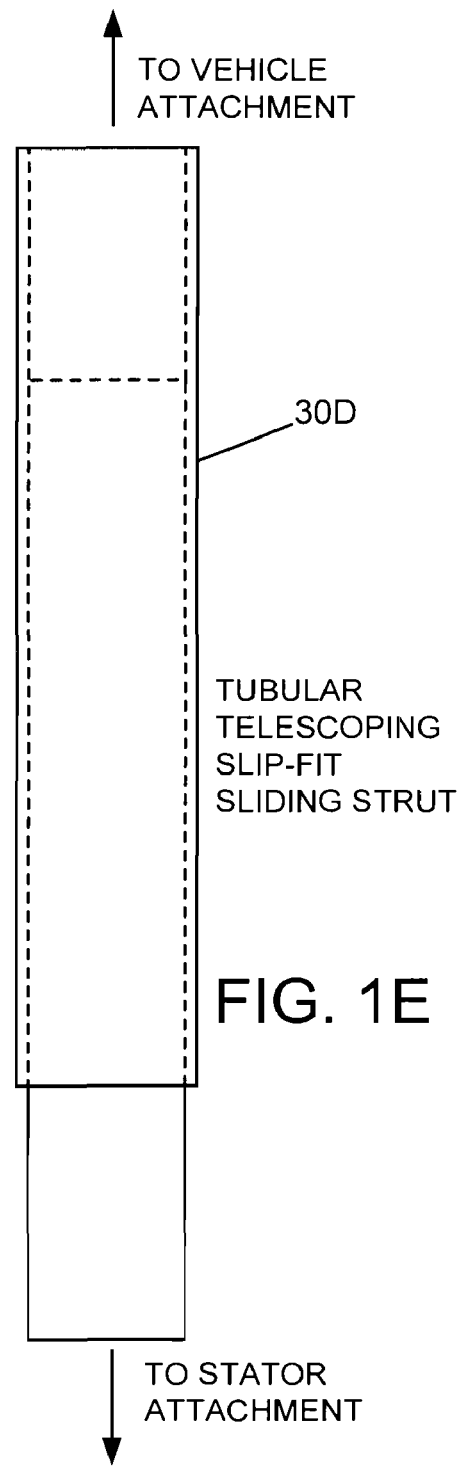
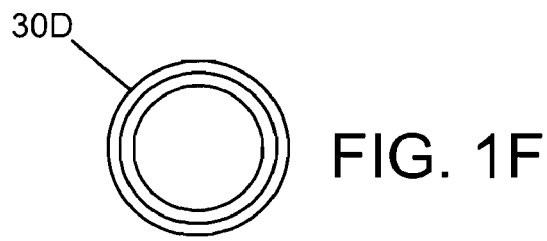
FIG. 1C — Rectangular Telescoping Ball-Bearing Sliding Strut
FIG. 1D
FIG. 1E — Tubular Telescoping Slip-Fit Sliding Strut
FIG. 1F

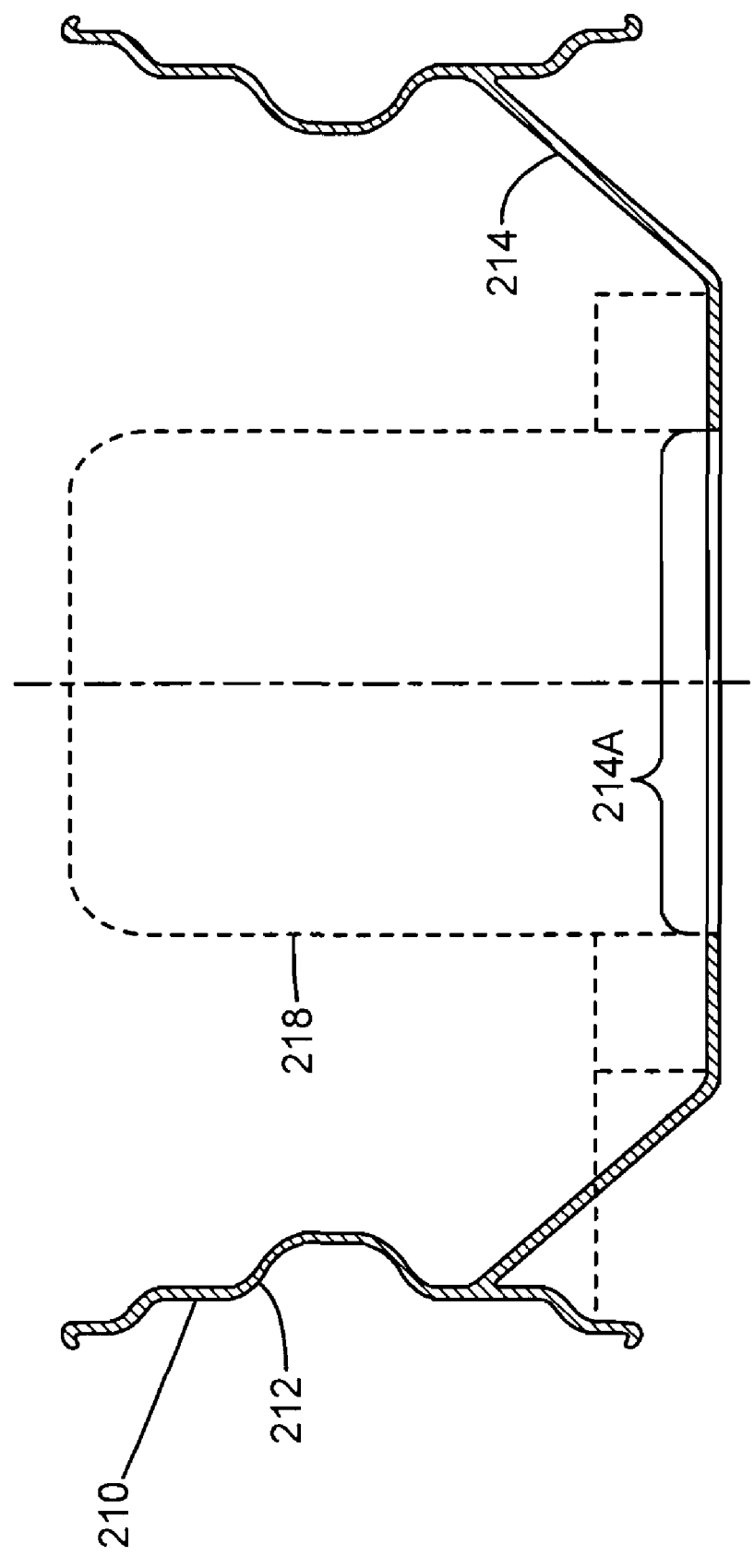

DIRECT DRIVE ELECTRIC TRACTION MOTOR

BACKGROUND

Fuel efficiency and cost of operation of motor vehicles has been of increasing importance, particularly with the substantially increased costs of fossil fuels. Electric vehicles and hybrid fossil-fuel/electric vehicles have seen increased usage and market acceptance. Additional advancements in operating efficiency or increased fuel economy would be welcome.

BRIEF DESCRIPTION OF THE DRAWINGS

FIG. 1 is a diagrammatic view illustrating an exemplary embodiment of a vehicle having a direct drive traction motor mounted on a rear wheel.

FIGS. 1C-1D and 1E-1F illustrate respective exemplary embodiments of struts suitable for inhibiting rotation of a stator of a direct drive electric motor stator while permitting movement along a linear axis.

FIG. 3 is a schematic block diagram of an exemplary vehicle direct drive electric traction motor system.

FIG. 6 is a cross-sectional view of an exemplary wheel for a heavy duty vehicle.

FIG. 17 illustrates an embodiment of a 6/4 switched reluctance motor with a stator outside configuration. FIG. 18 illustrates an embodiment of a 6/4 switched reluctance motor with a rotor outside configuration. FIG. 19 illustrates an embodiment of a 12/8 switched reluctance motor with a stator outside configuration. FIG. 20 illustrates an embodiment of a 12/8 switched reluctance motor with a rotor outside configuration.

DETAILED DESCRIPTION

Figure 1A:
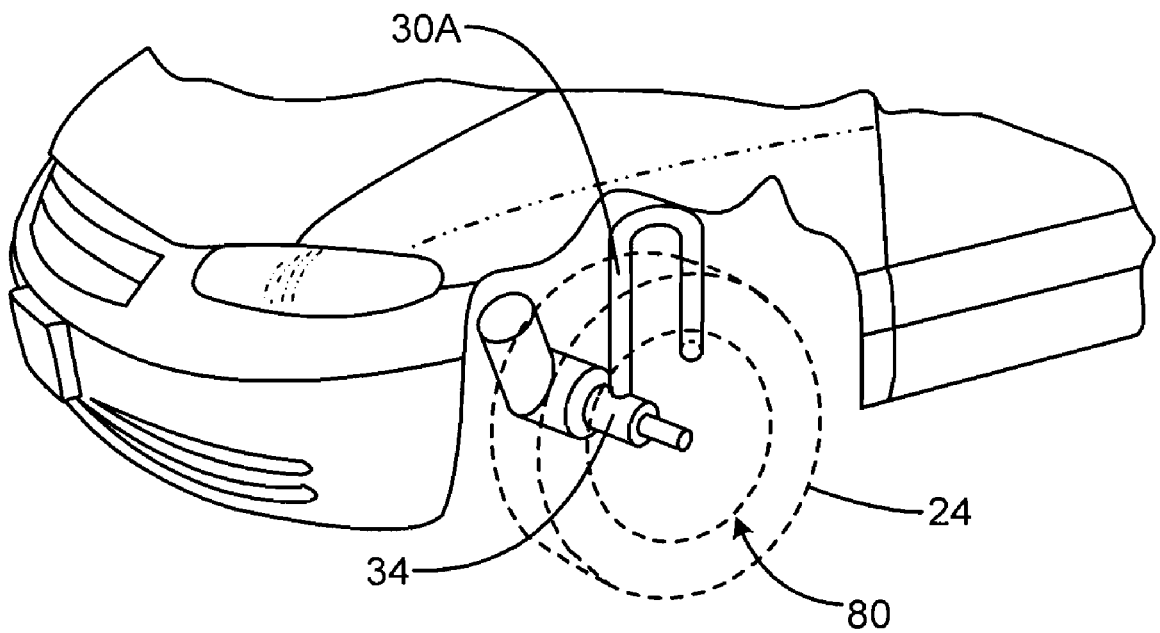
FIGS. 1A-1B are simplified diagrammatic views illustrating exemplary embodiments of a vehicle having a direct drive traction motor mounted on a front, steerable wheel.

In the following detailed description and in the several figures of the drawing, like elements are identified with like reference numerals. The figures may not be to scale, and relative feature sizes may be exaggerated for illustrative purposes.

Described herein are embodiments of a direct drive electric traction motor configured for direct attachment to the wheel of a vehicle. The electric motor may be powered by electric power generated by the vehicle or by an attached vehicle, e.g. a trailer vehicle pulled by a tractor vehicle. The electric motor rotor may be mechanically attached to the wheel. The electric motor stator may be configured to allow the wheel and rotor to freely rotate. For example, a bearing assembly may be employed to hold the stator such that concentricity between rotor and stator is sufficiently maintained to allow free rotation of the rotor and without detriment to the function of the electric motor. Stator rotation may be inhibited by a mechanical connection between the vehicle and stator, for example, to inhibit rotation of the stator during motor vehicle motion.

An exemplary embodiment of a direct drive electric traction motor may be configured electrically to assist or replace a vehicle internal combustion engine over the entire operating profile, including overcoming resting inertia at start-up, through acceleration and finally at cruising speed, thus reducing internal combustion engine load and fuel consumption over the whole operating profile. The vehicle start-up profile typically employs a low wheel rotational speed and generation of high torque, while at cruising speeds, the motor vehicle has relatively constant wheel rotation speed and low generated torque.

Figure 1B:
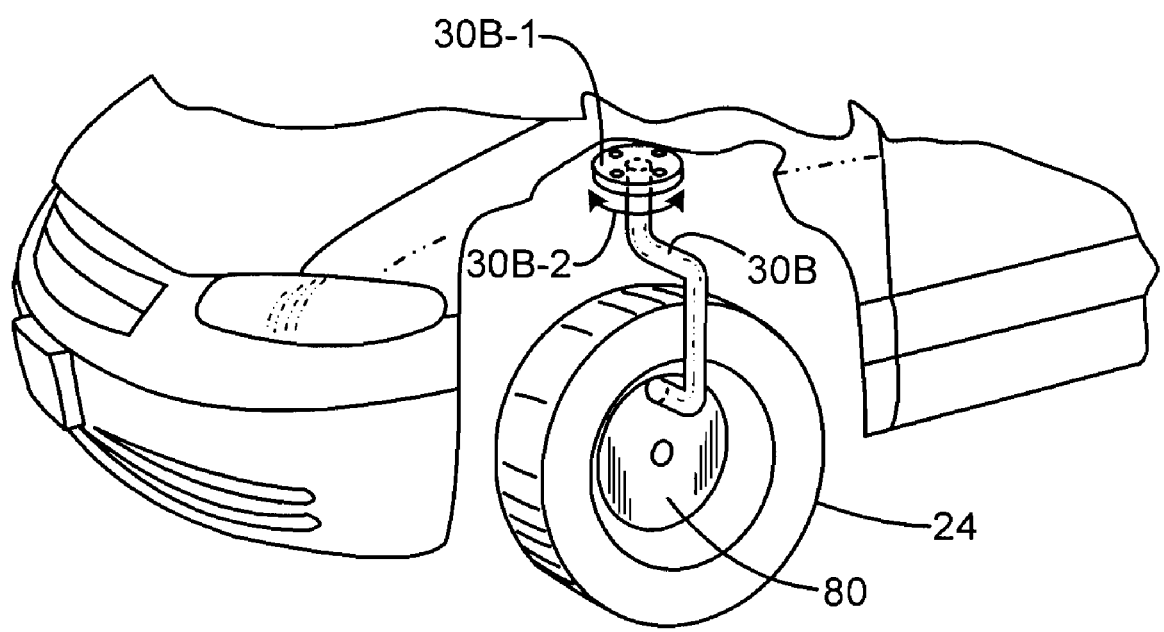

In one exemplary embodiment, a direct drive electric traction motor may be configured for direct attachment to the non-steering, fixed wheels of a motor vehicle using electric power generated by the motor vehicle. In another exemplary embodiment, the direct drive traction motor is installed on steerable wheels with suitable modification of the support structure for the stator. FIG. 1 diagrammatically depicts a motor vehicle 10 including non-steering rear wheels 12, to each of which has been mounted a direct drive electric traction motor 50. FIGS. 1A-1B diagrammatically depict motor vehicles including a steerable wheel 24 having a direct drive traction motor mounted thereto.

Figure 2:
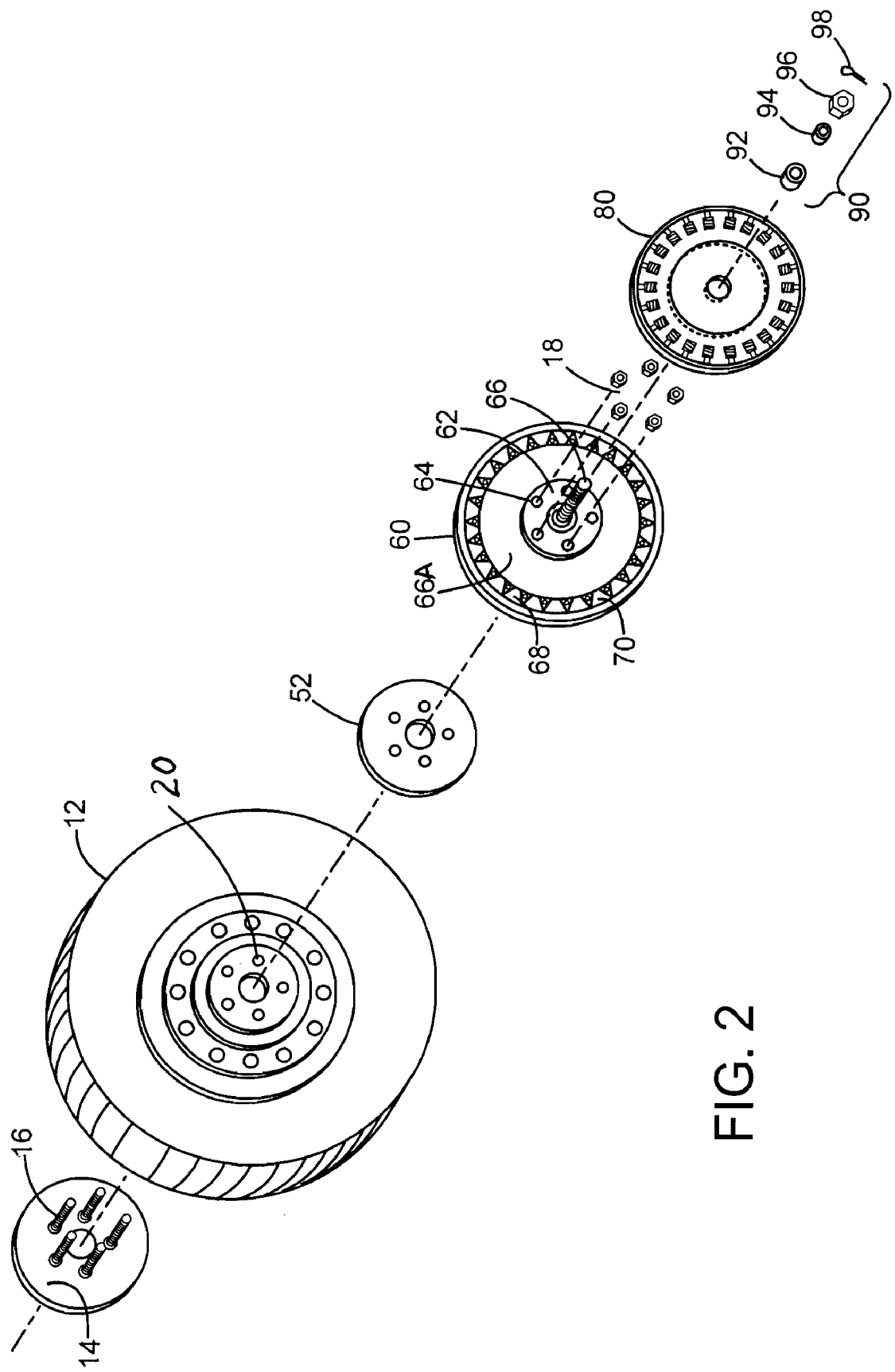
FIG. 2 is an exploded diagrammatic view of elements of an exemplary embodiment of a direct drive electric traction motor assembly.
Figure 2C:
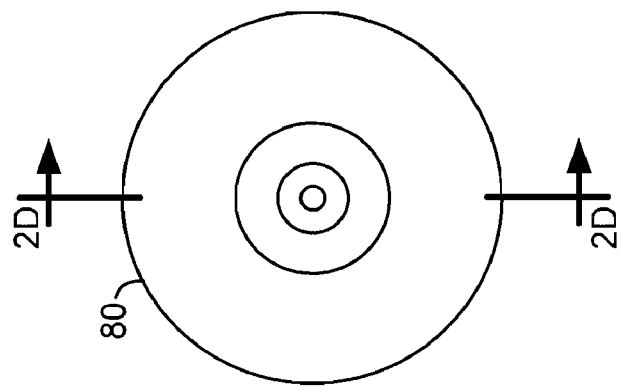
FIGS. 2A-2E diagrammatically depict in respective side and cross-sectional views an exemplary embodiment of a concentric rotor and stator configuration for a direct drive traction motor assembly, with the rotor concentrically positioned outside the stator.
Figure 2D:
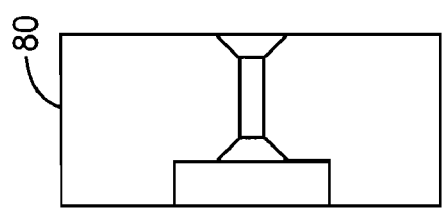
Figure 2E:
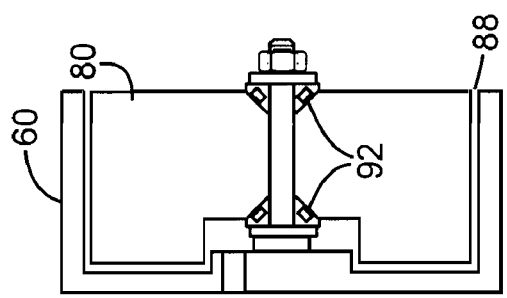
Figure 2B:
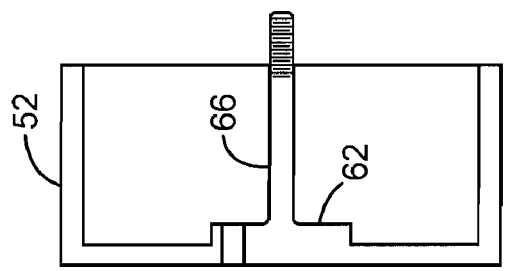
Figure 2A:
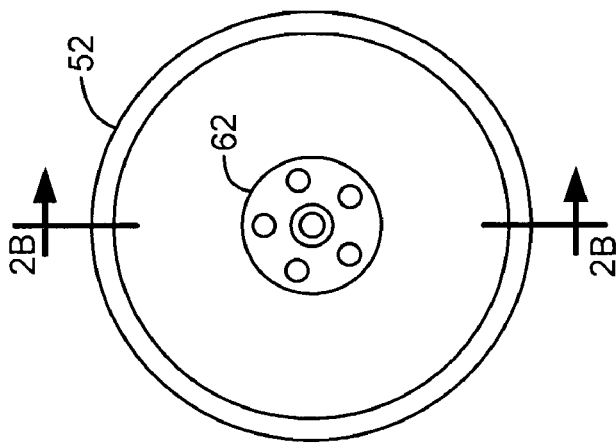

In an exemplary embodiment, a direct drive electric motor includes a rotor structure 60 and a stator structure 80, depicted in the exploded diagrammatic view of FIG. 2. A motor vehicle rotating wheel 12 (or 24) may be configured to provide or carry a rotor structure 60. The electric motor rotor may be mechanically attached to the wheel, such that it rotates with the wheel about the wheel axis. An exemplary technique for attaching the rotor structure to the rotatable wheel 12 is diagrammatically illustrated in FIG. 2. The wheel 12 is mounted to axle hub 14 on lug bolts 16, with the bolts 16 passed through holes 20 formed in the wheel 12. A stabilizing adapter plate 52 having a lug bolt opening pattern may also be mounted on the lug bolts, if desired, with a wheel facing surface having a contour matching portions of the contour of the wheel 12 facing the adapter 52. In some embodiment, the adapter 52 may be omitted. The rotor structure 60 in this exemplary embodiment includes a generally flat hub portion 62 with a bolt opening pattern 64 matching the lug bolt pattern of bolts 16, and a web portion 66A connecting an outer region 68 carrying the rotor permanent magnets 70 arranged about the region 68. A set of lug nuts 18 secures the rotor structure, adapter 52 and wheel 12 to the axle hub 14. Alternatively, the hub portion 62 may be a separate structure from the rotor. The hub portion 62 includes a threaded bearing extension axle 66, in this exemplary embodiment. In another embodiment, the vehicle axle may include an integral extension, long enough to mount the rotor and stator assemblies without a separate axle extension. In the event the lug bolts 16 for a given vehicle are not long enough to secure the elements of the motor, lug bolt extenders or nut extenders may be employed.

A substantially fixed, non-rotating stator structure 80 of the electric motor may be attached to the vehicle, and configured to allow the wheel and rotor 60 to freely rotate while being held in an operational position relative to the rotor structure. In an exemplary embodiment, a stator bearing assembly 90 may be used to hold the stator 80 concentric to the rotor 60 while allowing free rotation of the rotor relative to the stator 80 and without detriment to the function of the electric motor. The exemplary bearing assembly 90 includes a bearing race 92, a roller or ball bearing 94, and a threaded nut for engaging the threaded end of the axle 66. A cotter pin 98 may be inserted through a bore formed in the end of the axle 66 to prevent the nut from loosening. The bearing assembly thus provides a means of maintaining concentricity between the stator 80 and the rotor 60, and permitting relative rotation between the rotor and the stator. Other arrangements for permitting relative rotation between the rotor and stator may alternatively be employed. For example, a slip bearing may be employed rather than a ball bearing.

In an exemplary embodiment, during operation, the stator is held in a non-rotational position relative to the rotor. In an exemplary embodiment, inhibiting stator rotation may be accomplished by anchoring the stator in a non-rotating position using one or more struts attached to the body, chassis or suspension system of the motor vehicle, to the fender, for example, to inhibit rotation of the stator during motor vehicle motion. In one exemplary embodiment, the strut may permit movement of the stator relative to the vehicle chassis or body, in response to vehicle suspension action. The struts can be used to support the electrical cabling to the electric motor excitation coils. Any mechanism that maintains concentricity of the rotor and stator, allowing the free rotation of the wheel and tire and rotor assembly, and inhibits the rotation of the stator may be employed. FIGS. 1C-1F illustrate two respective exemplary embodiments of a strut suitable for permitting movement of the stator along a linear axis. FIGS. 1C-1D illustrate in plan and end views a strut 30C which is a rectangular (cross-section) telescoping, ball-bearing sliding strut in which one end may be attached to the stator and the opposite end is fixed to the vehicle chassis or body, so that the strut is oriented in a generally vertical orientation. FIGS. 1E-1F illustrate front and end views of a tubular telescoping slip-fit sliding strut 30D, in which one end is attached to the stator and the opposite end is attached to the vehicle chassis or body. Each embodiment permits movement of an attached stator along a strut axis, and may be secured to the vehicle body or chassis to inhibit rotational movement of the stator about its axis.

In an exemplary embodiment, the rotor may be positioned such that it occupies an outer portion of the motor diametrical space and the stator occupies an inner portion of the concentric motor configuration. This configuration takes advantage of the fact that, for the same energy input, its moment and therefore the torque applied to the wheel and tire assembly may be greater than if the position of the rotor and stator were reversed; i.e., if the stator were on the outer most and the rotor was on the inner most diameter. FIGS. 2A-2E depict an exemplary embodiment of a configuration of the rotor 60 and stator 80.

The rotor 60 in this exemplary embodiment has a cup-like configuration, with a center axle 66 protruding from a center hub 62. The stator 80 has a generally cylindrical outer periphery, which is sized so that the stator 80 may be bearing mounted on the axle 66 with bearings 92 for rotation about the axle 66, with an air gap 88 (FIG. 2E) between the facing surfaces of the rotor and stator. The permanent magnets 68 (FIG. 2) are not shown in FIG. 2A, 2B or 2E for clarity, but may be installed in the outer periphery of the rotor. Similarly, the coils of the stator 80 are not shown in FIGS. 2C-2E for clarity. The direct drive traction motor depicted in FIG. 2 may be a brushless DC motor configuration with permanent magnets, although other motor configurations may alternatively be employed, as described below.

At 60 miles per hour, a nominal 15" wheel and tire assembly has a rotational speed of approximately 775 revolutions per minute (rpm); for a long-haul-type semi-truck with an estimated nominal wheel and tire assembly diameter of 36 inches, the rotational speed at 60 miles per hour is approximately 560 rpm. As a class of electric motors, the direct drive electric traction motor for a motor vehicle is a low-rpm application. Use of high speed electric motors may lead to the use of a gear-reduction mechanism, thus complicating and increasing the cost of the drive.

For the existing designed and manufactured world-wide fleet of motor vehicles, a direct drive electric traction motor may be attached to the outer surface of the wheel and tire assembly, e.g. as depicted in the exemplary embodiment of FIG. 2. In other embodiments, the direct drive electric traction motor may be designed for attachment to the inside surface of the wheel and tire assembly.

It is recognized that the attachment of a direct drive electric traction motor to a wheel and tire assembly may lead to balance issues, and these may be resolved by balancing procedures using balancing weights.

Figure 4A:
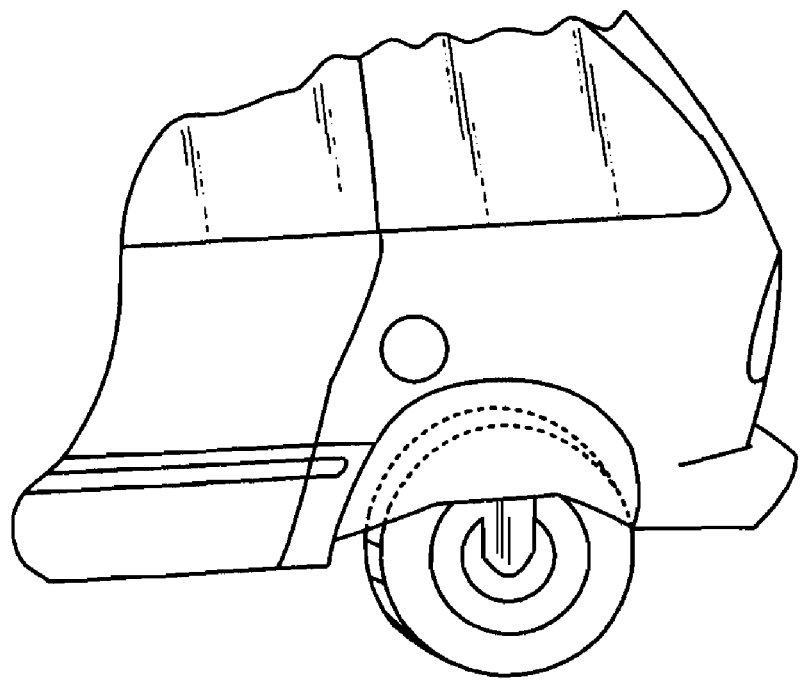
FIGS. 4A and 4B illustrate exemplary embodiments of vehicle fender skirt arrangements.
Figure 4B:
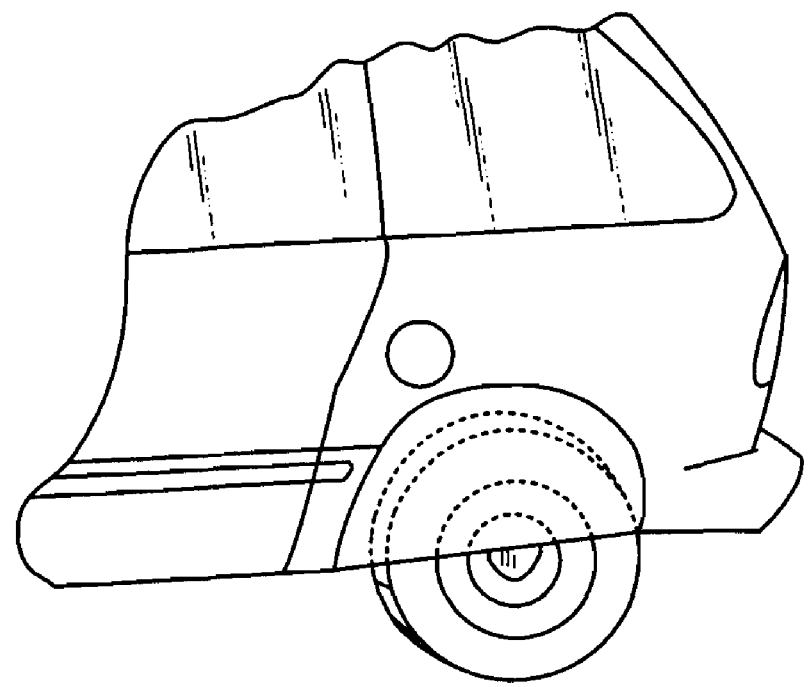

The use of the anchoring struts, e.g. struts 30 in the embodiment of FIG. 1, to inhibit the rotation of the stator may not be eye-appealing. To obscure the view of the struts, partial or full fender skirts may be employed, as depicted in FIGS. 4A and 4B. Additionally, the fender skirt can be an integral part of the strut assembly or as a complete replacement for the strut by using appropriate mechanical attachments to inhibit stator rotation.

FIG. 1 depicts a passenger vehicle or van with direct drive electric traction motors installed on the rear wheels, which may be non-steerable wheels, and the strut 30 inhibits rotation of the stator assembly. The electric motor drive system may also be adapted for installation on steerable wheels. FIGS. 1A and 1B illustrate exemplary installation embodiments on steerable wheels. For example, the strut 30A of the FIG. 1A embodiment is an arm attached to the wheel steering suspension system 34, and as well to the stator 80 of the motor so that the strut 30A and stator will rotate about the steering axis with the wheel 24. Referring to FIG. 1B, the strut arm 30B is connected to a rotatable plate 30B-1 connected to the fender well, for example, to allow the strut arm 30B to rotate about the steering axis 30B-2.

The electrical power generation source for the electrical system of a conventional fossil-fueled motor vehicle is the generator or alternator (after the vehicle engine is started with battery power). After start-up, the alternator recharges the starting battery and may provide electrical power to the electrical systems in the motor vehicle (radio, lights, instrument panel, etc.).

An exemplary embodiment of an alternator generates three-phase alternating current (ac) power. Since the motor vehicle electrical systems operate on direct current (dc) power, the ac power is rectified into dc power. This may typically be accomplished internally to the alternator. With few exceptions, the three-phase ac is typically not accessible external to the alternator. Furthermore, the ac frequency may be much higher than the typical frequency that might be used by some embodiments of a direct drive electric traction motor. A controller/motor drive for an exemplary embodiment of a direct drive electric traction motor may be adapted to convert this alternator signal from DC to AC at the requisite AC frequency/frequencies.

FIG. 3 depicts a functional block diagram schematic for adaptation of exemplary direct drive electrical traction motors 50-L and 50-R on left and right wheels of an exemplary vehicle with an internal combustion engine (ICE), a battery pack or fuel cell 200, depending on the vehicle type, e.g. hybrid, electric or internal combustion engine vehicle. The motors 50-L and 50-R are preferably mounted on wheels on opposite sides of the same vehicle axle. The motor vehicle electrical power generation system (EPGS) 210 includes the alternator (ALT) 212, battery (BAT) 214 and protection system (PS) 216. The protection system typically may include circuit breakers, relays and fuses that are connected between the battery and the rest of the electrical system and interrupt the ac system and/or isolate the batteries in case of fault. The motor vehicle power train system (MVPS) 202 may include the transmission and differential (for rear wheel drive vehicles) or transaxle (for front wheel drive vehicles) and other non-electrical controls required for motor drive. In an exemplary embodiment, the vehicle electronic control unit (VECU) 220 may be a microprocessor-based control system that accepts and interprets sensor information and adjusts engine function to optimize performance.

An exemplary embodiment of an adaptation of the direct drive electric traction motor to an ICE motor vehicle may employ a controller (DDETM C) 100 to provide traction motor speed and torque, whether ac or dc driven. The power conditioner (DDETM PC) 110 accepts electrical power from the electrical power generation system of the motor vehicle and converts the incoming ac or dc to the specific AC or DC power required to operate the traction motors over the operating profile as directed by the traction motor controller (DDETM C) 100.

Feedback and vehicle sensor parameters may be monitored for adjustment or interruption of power to the traction motors. For example, when an operator brings a motor vehicle to a halt or slows the vehicle by braking, the power to the traction motors 50-L, 50-R may be interrupted. Power may be restored when the brakes are released and the accelerator mechanism is activated. Feedback mechanisms may be readily incorporated to provide input to the traction motor controller and existing monitoring systems for overall control operation of the motor vehicle. For example, when a driver brings a vehicle to a halt or slows the vehicle, the power to the exciter coils of the stator may be interrupted. Sensor devices such as brake light switches may be adapted to provide signals to the controller that power should be interrupted. Of course other sensor arrangements may alternatively be employed. Power to the direct drive traction motor may be restored when the brakes are released, and the accelerator mechanism is activated. Another example is when a motor vehicle makes a turn (as at a corner or entering a driveway) and no braking is used. In this case, the electrical power to the motor on the wheel on the inside of the turn may be interrupted or altered to reflect the fact that the inside wheel rotates at a slower speed than the outside wheel. A steering sensor may be employed for this purpose. Alternatively, interruption of power to motors on both sides of the axle may be ordered by the controller during turns, as a result of steering sensor signals.

Electronic control units are found in most recent vintage motor vehicles, and include sensor inputs and mechanical, electromechanical or electronic actuation controls. Many vehicles with antilock brake systems include sensors on each wheel to detect wheel spin and rotation parameters. The direct drive traction motor may be integrated into vehicle systems, and updated control algorithms implemented with the vehicle control units to enhance performance through software/firmware and hardware controls. Speed matching controls may be employed to ensure that wheels on both sides of the vehicle are driven at the same rate by the motor. Wheel rotation speed sensors can be utilized to capture rotation information for each wheel, and to adjust the electric power provided to each wheel for matching purposes. Sensors already in place for antilock brake systems may provide signals useful for this purpose as well.

A direct drive traction motor system may also be adapted to large, heavy-duty vehicles. It is believed that the U.S. trucking industry exhibits a much greater degree of wheel standardization than the passenger vehicle segment of the motor vehicle industry. This higher degree of wheel standardization may also lead to greater economies of scale, since a direct drive traction motor system can be implemented for a standard wheel size and configuration.

Figure 5:
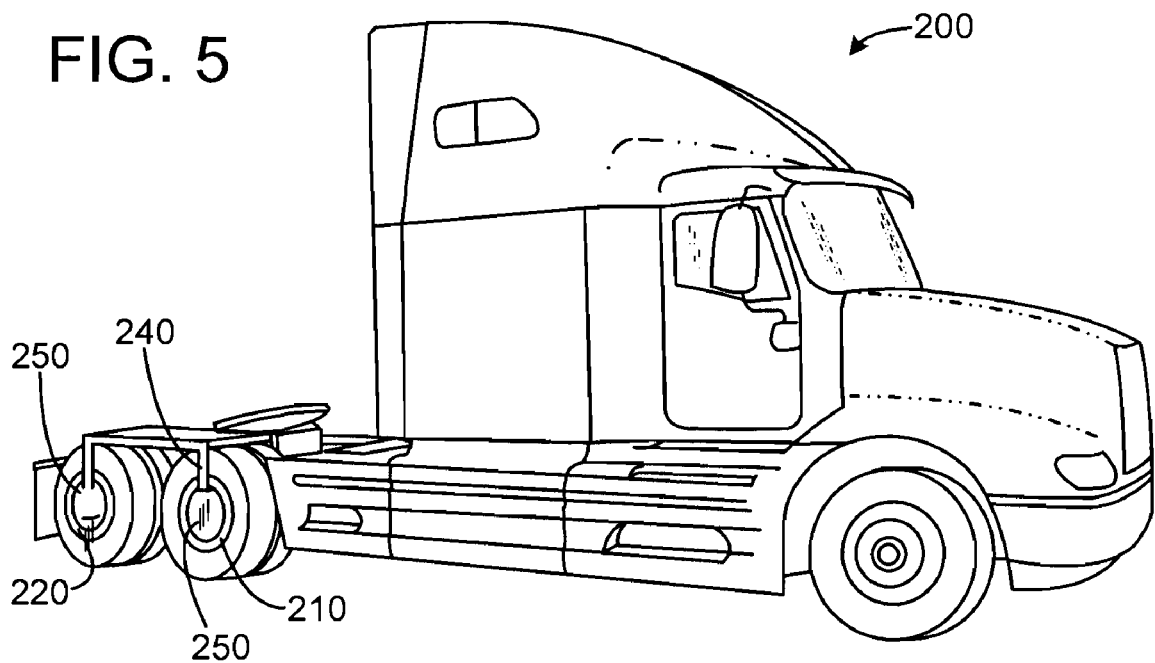
FIG. 5 is a diagrammatic view of an exemplary embodiment of a semi tractor vehicle employing a direct drive electric traction motor.

FIG. 5 diagrammatically depicts an exemplary embodiment of a tractor vehicle 200 for pulling a trailer. In this example, the tractor 200 has one or two drive axles, each with two or four wheels per axle. In an exemplary embodiment, each outer wheel for each axle may be fitted with a direct drive traction motor. For example, wheels 210 and 220 may each be fitted with a direct drive traction motor 250. A strut system 240 may be employed to inhibit rotation of the stators, and to carry wiring to the stator to enable electric signals to be supplied to the stator.

Figure 5A:
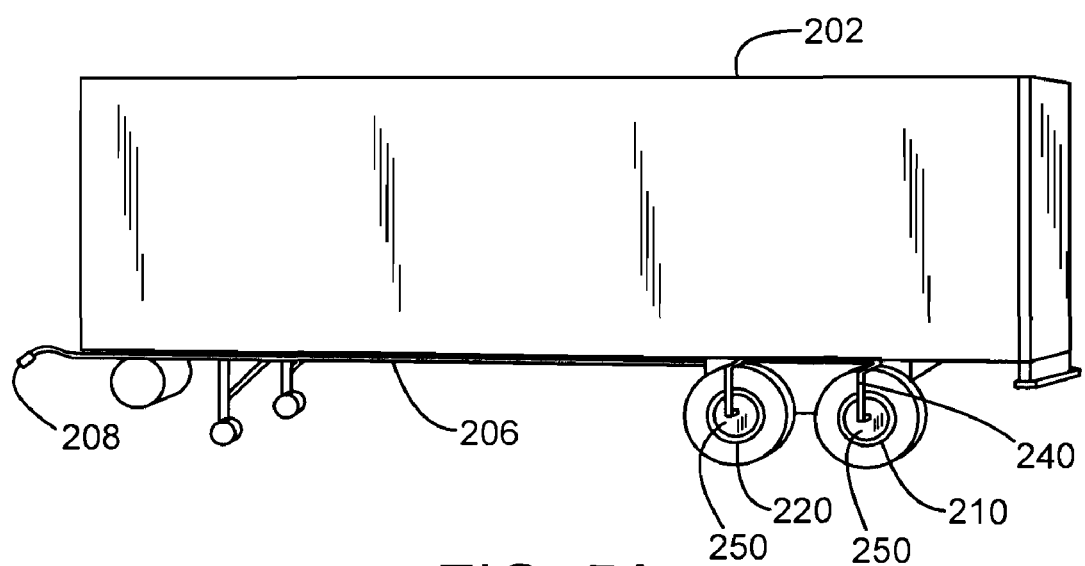
FIG. 5A is a diagrammatic view of an exemplary embodiment of a trailer vehicle employing direct drive electric traction motors.

FIG. 5A depicts a trailer 202 which may be pulled by the tractor 200 of FIG. 5. The trailer is typically fitted with one or two axles, each with a complement of two or four wheels 210, 220. In an exemplary embodiment, the outer wheel of each axle, or at least one axle, may be fitted with a direct drive traction motor 250, which may receive its electrical power from the tractor 200 through a cabling 206 and connector 208.

FIG. 6 depicts a cross-sectional view taken through an exemplary embodiment of a wheel 210 for a heavy duty vehicle such as tractor 200. This wheel has an outer rim portion 212, to which the tire is fitted, and an interior web or hub portion 214. The rim portion may have an exterior diameter of 22½ or 24½ inches, two predominant standard wheel sizes, and a 10 inch height dimension from rim edge to rim edge. The web portion 214 is formed with a concentric axle opening 214A, which may have a typical diameter of 8⅝ inches. The web portion 214 is further formed with a lug bolt opening pattern, of ten openings spaced around a circular pattern. In an exemplary embodiment, the lug bolt openings are 1¼ inch diameter holes, formed on an 11¼ inch diameter. These dimensions are for a typical wheel design, but other wheel dimensions may also be implemented.

The phantom line 218 in FIG. 6 depicts a volume envelope that may be occupied by a truck axle assembly and the lug bolt ends and lug nuts. The height of the volume envelope may vary from vehicle to vehicle model, as a result of differing axle configurations by the truck manufacturers. For an exemplary embodiment of a standardized direct drive traction motor implementation, this envelope is dedicated space not available to the traction motor system components. However, considerable volume is available between the envelope space and the rim portion of the wheel, which may be employed to mount elements of a direct drive traction motor. An exemplary motor configuration is depicted in FIGS. 7-8.

Figure 7:
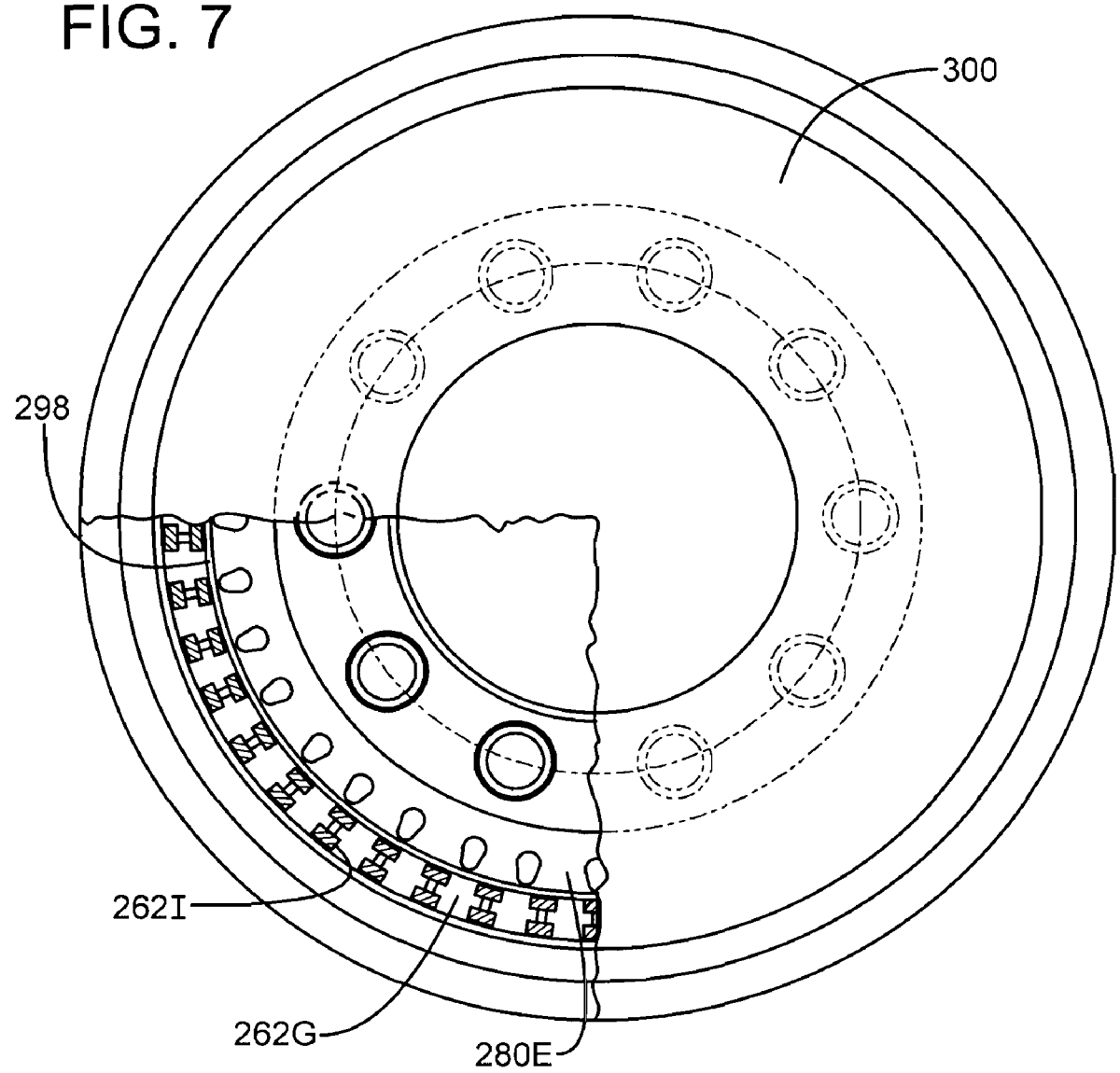
FIG. 7 is a front, partially broken-away view of an exemplary embodiment of a stator-rotor structure for a direct drive electric traction motor for the vehicle of FIG. 5.
Figure 8:
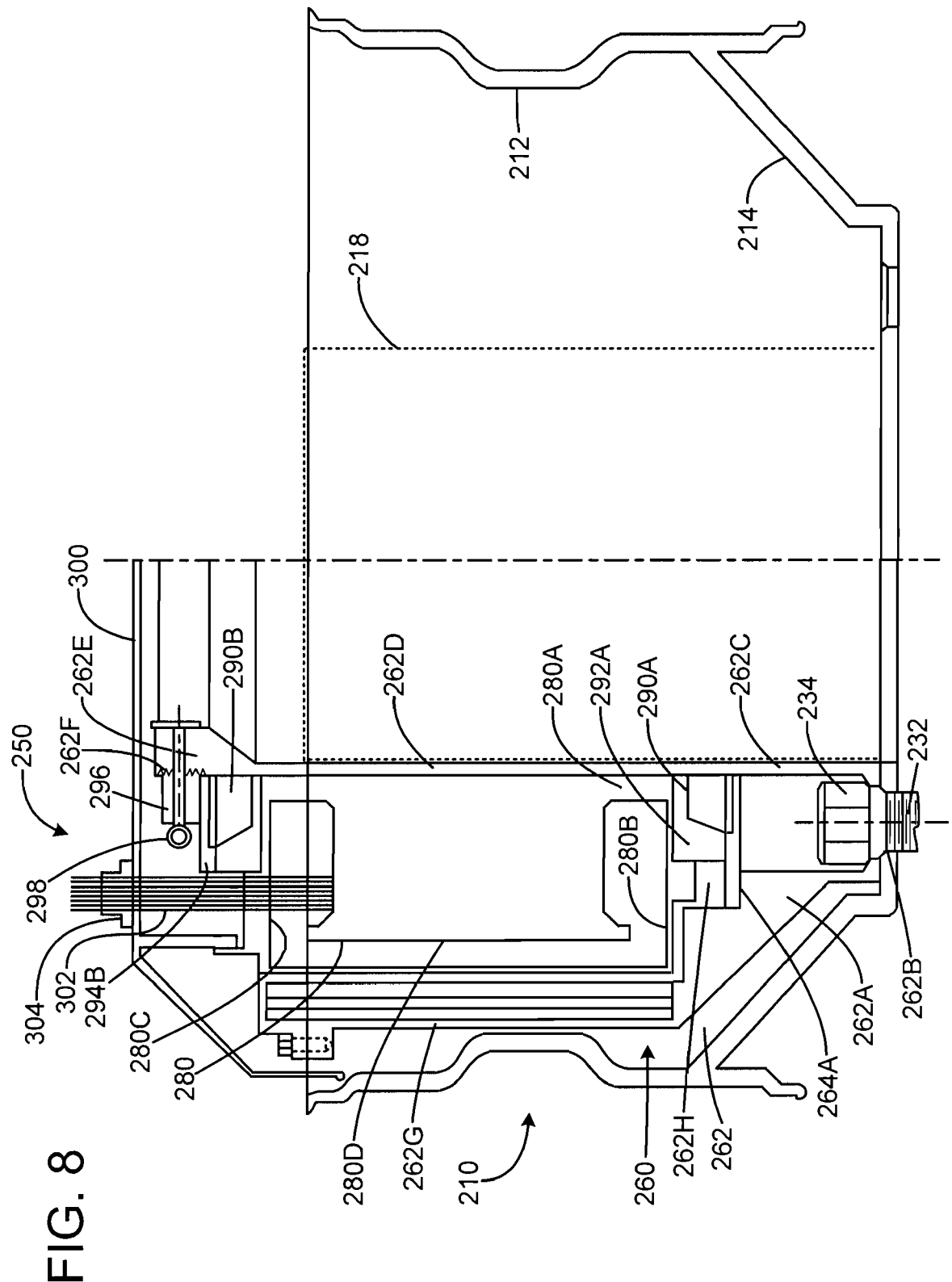
FIG. 8 is a simplified diagrammatic cross-sectional view of the structure depicted in FIG. 7.

Referring now to FIGS. 7-8, features of an exemplary configuration for a direct drive traction motor 250 for a tractor 200 are illustrated. FIG. 7 is a simplified partial front view of the wheel and motor assembly. FIG. 8 is a simplified partial diagrammatic cross-sectional view of the wheel and motor assembly of FIG. 7, wherein for simplicity only a portion of the rotor and stator assemblies are illustrated. The motor 250 generally includes a rotor assembly 260 and a stator assembly 280.

The rotor assembly 260 includes a rotor housing structure 262 which has a generally circularly symmetrical configuration about the center axis of the wheel. The rotor housing structure 262 has a hub portion 262A with an outer periphery which generally matches the shape of the web portion 214 of the wheel 210. In this embodiment, the exemplary hub portion 262A has formed therein ten openings 262B and relieved bores 262C for receiving the respective lug bolts 232 and lug nuts 234. Of course, the number of openings is selected to match the lug bolt pattern for the particular application. FIG. 8 depicts an exemplary embodiment adapted for the wheel depicted in FIG. 6. The rotor housing structure 262 is secured in place relative to the wheel, and rotates with the wheel, by the lug bolts and nuts.

The rotor housing structure 262 further includes an inner cylindrical wall portion 262D, which at its outer end tapers inwardly above the envelope 218 to form a rim portion 262E. The rim portion has an outer peripheral threaded surface 262F. The rotor housing structure 262 further includes an outer cylindrical wall or rotor core 262G, spaced from the inner wall 262D to form an annular open space 262H. Slots 262I (FIG. 7) are positioned in the rotor core 262G. In an exemplary embodiment, the slots of the rotor are windings, e.g. conductors shorted at each end by shorting rings. Alternatively, the rotors slots may include permanent magnets, although for a large heavy goods vehicle which may use large or a large number of magnets, this may be cost ineffective.

The stator 280 is adapted to fit within the annular open space 262H such that an air space 298 (FIG. 7) is defined between facing surfaces of the rotor and stator, and has a generally circularly symmetrical configuration about the center axis of the wheel. The stator structure 280 includes an inner wall portion 280A, and upper and lower wall portions 280B and 280C. The stator structure further includes a core portion 280D protruding from the inner wall portion 280A, in which stator slots 280E (FIG. 7) are formed.

The stator structure 280 is bearing mounted to allow relative rotation between the rotor and stator. For example, the bearing mounting may include upper and lower bearings 290A, 290B, upper and lower bearing races 292A, 292B. Constraining washers 294A, 294B hold the bearing elements in position. In an exemplary embodiment, a ball bearing system may be employed, although other types of bearing systems may alternatively be employed. A flat threaded nut 296 engages the threads 262F of the rotor portion 262E to secure the bearing mounting in place. A pin 298 locks the nut 296 in place.

A cover 300 may be attached to the stator assembly 280 to provide some protection from the elements. Electrical connections to the stator may be made through a wiring harness 302 and connector 304 in an exemplary embodiment.

Exemplary Motor Configurations

There are many different motor types and configurations which may be adapted for use in a direct drive traction motor system. Exemplary types of electric motors applicable to adaptation for direct drive electric traction motors for motor vehicles include brushed DC, induction, brushless DC, and switched reluctance motors. Each of these motor configurations has the ability to generate sufficient torque and speed to provide motive power to a vehicle. Some form of these options may be more applicable than others for a given vehicle size, weight and usage.

Brushed DC Motors

There are three main types of brushed DC (direct current) motors, shunt, series, and compound, depending on the way the field coils are connected. Shunt motors have the field coils connected in parallel with the armature circuit. This type of motor, with constant potential applied, develops variable torque at essentially constant speed, even under changing load conditions. Series motors have the field coils connected in series with the armature circuit. This type of motor, with constant potential applied, develops variable torque but its speed varies widely under changing load conditions. That is, the speed is low under heavy loads, but becomes high under light loads. Series motors are used extensively to start internal combustion engines. Compound motors have one set of field coils in parallel and another set of field coils in series with the armature circuit. This type of motor is a compromise between shunt and series motors. It develops an increased starting torque over that of the shunt motor and has less variation in speed than a series motor. Shunt, series and compound motors are all dc motors designed to operate from constant-potential variable-current dc sources.

In a dc motor, the stationary field coils induce a force in the armature coils to cause rotation of the armature and thus achieve the function as a motor in performing mechanical work. The coils of the armature are energized by external direct current electrical sources to produce fields that react to the stationary field coils. A commutator and brushes are typically used to energize the armature coils at different times to produce a rotational reaction to the stationary field coils. The purpose of a commutator is to reverse the polarity of the armature field coil as it passes through the dead center position between two stationary field poles in order to maintain continuous torque applied to the armature. As the armature with its commutator located at one end of the armature shaft rotates, brushes carrying current from the external source make contact with each of the armature field coils and cause a reversal of current flow in the armature field coil. This action maintains a reactive field to the stationary field poles and thus maintains continuous rotation of the armature.

Figure 9:
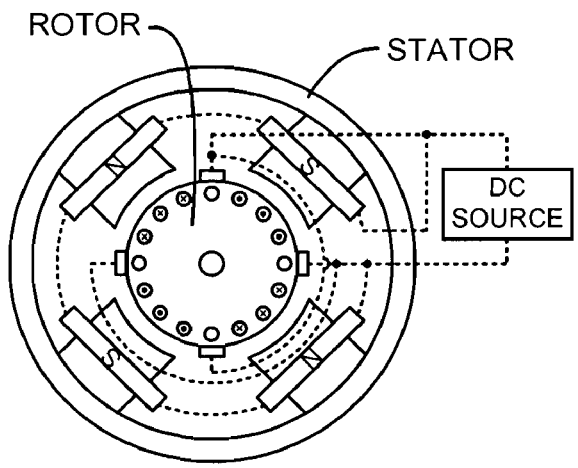
FIG. 9 is a simplified diagrammatic illustration of an exemplary embodiment of a brushed DC motor configuration with an outside stator configuration.
Figure 10:
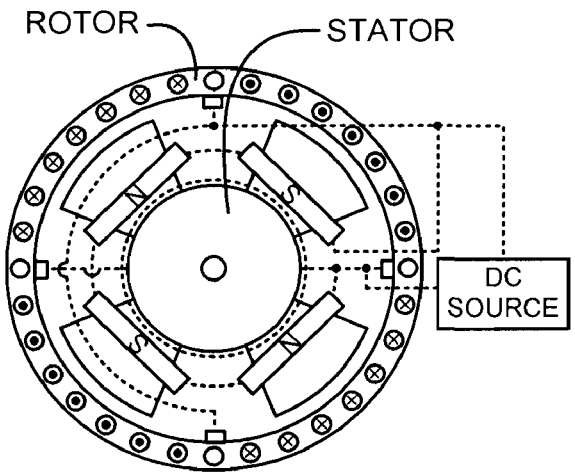
FIG. 10 is a simplified diagrammatic illustration of an exemplary embodiment of a brushed DC motor with an outside rotor configuration.

FIGS. 9 and 10 respectively illustrate a common configuration of a brushed DC motor with an outside stator (FIG. 9) and an outside rotor configuration of a brushed DC motor (FIG. 10), which may be utilized in a direct drive traction motor for a vehicle.

The commutator may include a number of wedge-shaped segments or bars of hard drawn copper that are assembled into a cylinder and attached at one end of the armature shaft. The commutator segments are insulated from each other, e.g., by sheet mica and the entire commutator is insulated from the supporting rings on the shaft, e.g., by mica collars. The brushes are located at fixed positions around the periphery of the commutator and ride over the surface of the commutator as the armature to which it is attached rotates. The brushes carry the current from the external source to the commutator segments. The brushes are usually made from a mixture of carbon and graphite. The brushes are free to slide in their holders so that they may follow any small irregularities in the surface of the commutator.

For good performance, a continuous and close contact is maintained between the commutator and brushes; the commutator and the brushes should be kept clean. This requires significant periodic maintenance. FIGS. 9 and 10 respectively illustrate a stator outside brushed DC motor configuration and an example of a rotor outside configuration for adaptation for a traction motor application to a vehicle, wherein the stator is inhibited from rotation while the rotor is allowed to rotate.

Induction Motors

An induction motor may include a stator and a rotor, the rotor separated from the stator by an air gap. In an exemplary configuration suitable for a direct drive vehicle traction motor, the stator may be an inner element and the rotor an outer element in a concentric arrangement. The stator core may be made up of laminations, and may carry slot imbedded conductors. These conductors are interconnected in a predetermined way and constitute the armature windings. Alternating current is supplied to the stator windings, and the current in the rotor windings is induced by the magnetic field of the current in the stator windings. The armature stator winding of a three-phase induction motor may be distributed over the stator periphery.

The rotor of the induction motor may be cylindrical or radial and may carry either (1) conduction bars short-circuited at both ends by shorting rings or a "squirrel cage" or (2) a polyphase winding with terminals brought out to slip rings for external electrical power connection or a "wound rotor". These two rotor configurations are "passive" or "active" rotor configurations, respectively. An exemplary embodiment of a direct drive traction motor for a vehicle may employ a passive cylindrical rotor configuration. Cylindrical or round rotor motors may be constructed with a rotor which includes a round cylinder of magnetic steel, usually solid. The field winding is contained in slots in the surface of the rotor.

An induction motor operates on the basis of interaction of induced rotor currents and the air gap magnetic field. If the rotor is allowed to rotate under the torque developed by this interaction, the machine will operate as a motor. However, if the rotor is driven by an external mechanical source at such a speed as to create electrical power, then it operates as a generator.

There are two types of induction motors, typically known as squirrel cage motors and wound rotor motors. FIG. 11 is a simplified diagrammatic illustration of an exemplary embodiment of a squirrel cage induction motor with an outside stator configuration. FIG. 12 is a simplified diagrammatic illustration of an exemplary embodiment of a squirrel cage induction motor with an outside rotor configuration. In the squirrel cage motors, the rotor winding is practically self-contained; it is not connected electrically to an outside power supply or control circuit. The rotor may be considered a passive rotor. The rotor may include a number of straight bars uniformly distributed around the periphery of the rotor and short circuited at both ends by end rings to which the bars are integrally joined. Since the rotor bars and end rings typically have fixed resistances, such characteristics as starting and pull-out torques, rate of acceleration and full-load operating speed are fixed for a given motor installation.

The rotating speed of the stator magnetic field in an induction motor is identical to the rotating speed of the stator magnetic field in a synchronous motor. In a synchronous motor the rotor rotating speed is the same as the stator rotating speed. However, in an induction motor the rotor rotational speed is slightly less than the rotational speed of the stator magnetic field. If the rotor could turn at synchronous speed, there would be no relative motion between conductors of the rotor and the rotating field of the stator magnetic field and therefore no current induced in the rotor conductors. With no rotor magnetic field, no torque would be produced. The induction motor therefore does not rotate at exactly the synchronous speed. But because of the losses in the rotor and the load imposed on the motor, the rotor will turn at a speed below synchronous speed. This will cause a relative motion between the conductors of the rotor and the rotating stator magnetic field and currents will be induced in the rotor conductors. This current will, in turn, produce a magnetic field that will interact with the rotating stator magnetic field, producing a torque necessary to overcome the resistance to turning caused by the losses in the rotor and the load imposed on the motor. The difference between the speed of the rotating stator magnetic field (the synchronous speed) and the resultant speed of the rotor may be defined as the "slip" of the induction motor.

NEMA (National Electrical Manufacturer's Association) Class C motors are usually equipped with a double squirrel cage winding and combine high starting torque with low starting current. These motors can be started at full voltage. The low starting current is obtained by design to include inherently high reactances. The slip at rated load is relatively low. Two sets of bars are used, with the inner bars (for the less common inside out rotor design) having a high resistance to produce a high starting torque with a low starting current. At running speed, nearly all of the rotor current flows in the outer windings (again, for the less common inside out rotor design). From the shape of the rotor slots, it is apparent that the bars on the outer cage are surrounded entirely by iron except for the constricted portion of the slot between the two cages which constitute an air gap. The bars of the inner cage are surrounded by iron at the sides only, and hence two air gaps in the magnetic field around them; since this path is much less perfect magnetically than that around the outer conductors, its inductance is lower.

Figure 11A:
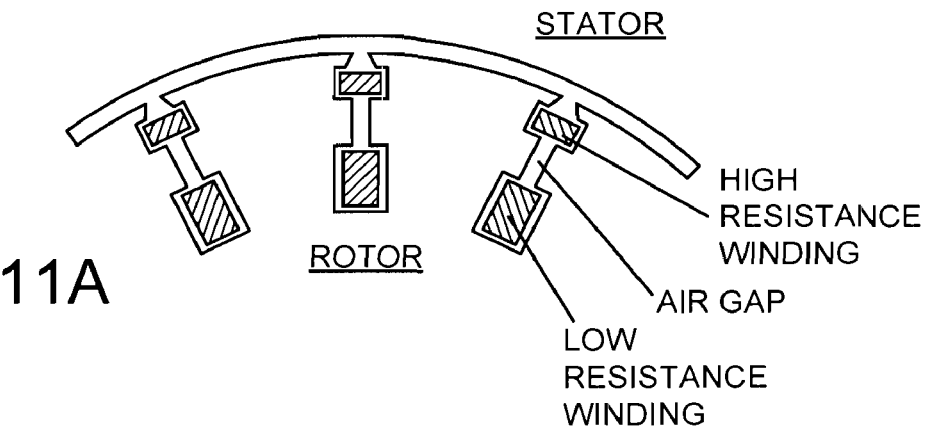
FIGS. 11A and 12A illustrate configurations of Class C rotor windings for a stator outside configuration and a rotor outside configuration, respectively.
Figure 12A:
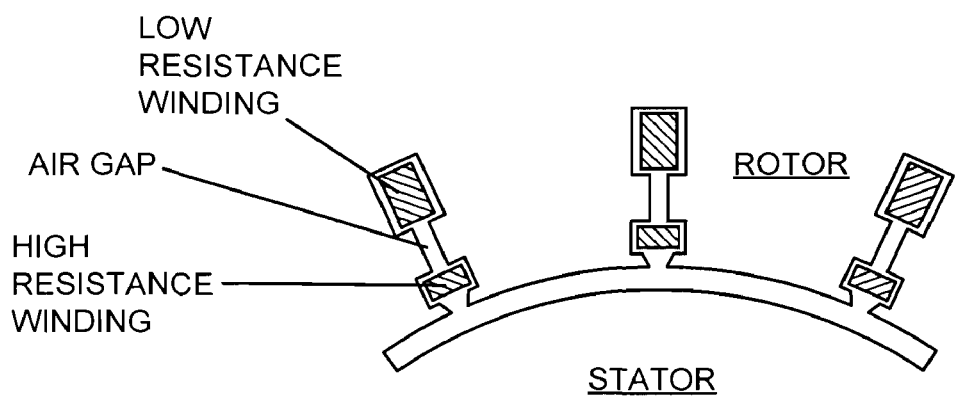
Figure 11:
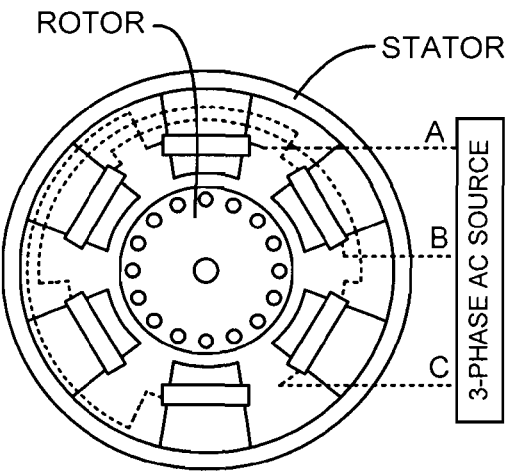
FIG. 11 is a simplified diagrammatic illustration of an exemplary embodiment of a squirrel cage induction motor with an outside stator configuration.
Figure 12:
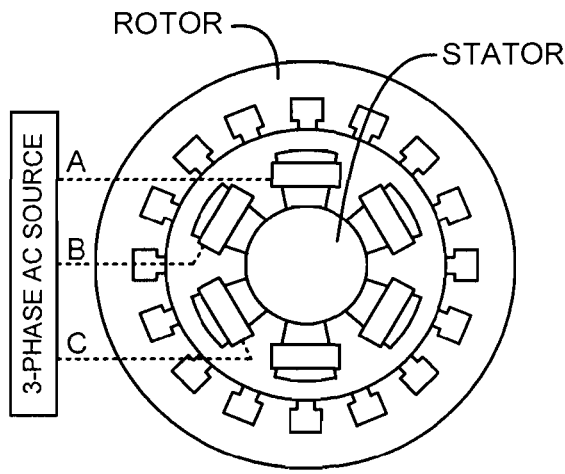
FIG. 12 is a simplified diagrammatic illustration of an exemplary embodiment of a squirrel cage induction motor with an outside rotor configuration.

FIGS. 11A and 12A illustrate exemplary double squirrel cage winding configurations. FIG. 11A diagrammatically illustrates an inside rotor configuration. FIG. 12A diagrammatically illustrates an outside cylindrical rotor configuration, which may be employed in the exemplary embodiment of FIG. 8. In a squirrel-cage motor, the rotor (or squirrel-cage) winding takes the place of the rotor field winding in a synchronous motor. The rotor may be constructed of steel laminations, but the windings may be fabricated of conductor bars placed approximately parallel to the shaft and usually close to the rotor surface. These windings are short-circuited, or connected at each end of the rotor, by a solid ring. As the stator magnetic field rotates relative to the rotor, it cuts the squirrel cage conductors and induces current to flow in the squirrel cage circuit. The current flowing in the squirrel cage, down one group of bars and back up on the opposite side of the rotor makes a loop that establishes magnetic poles. The poles of the rotor are attracted by the poles of the rotating stator field and follow them around, causing the rotor to rotate.

At the instant of starting, the rotating field of the stator current sweeps across both sets of rotor conductors, i.e. the inner conductor set and the outer conductor set, at the frequency of the excitation AC input, i.e. the excitation frequency, and induces currents in them. Since the inner conductors have a relatively low inductance and high resistance, most of the induced current flows in this winding at startup. In the outer conductors, however, the current is greatly impeded by the combined action of the high reactance of this winding and the frequency of the current. In fact, the choking action of the self-induction at the excitation frequency is so great that very little current can flow through this winding at the start.

As the rotor gains in speed, the frequency of the currents induced in it decreases and the relationship between the currents in the two cages gradually and automatically changes to that shown for the normal running speed. For this speed, the rotor currents are proportional to the slip, and they alternate at low frequency, e.g. only about 1 Hz. At this low frequency, the high inductance of the outer cage winding is or relatively little importance and produces little choking effect. The resistances of the two cages are now the chief limiting factor in the rotor currents. Consequently, the outer low-resistance cage carries most of the total rotor current, with the advantageous results noted above. The starting torque of double squirrel cage motors is greater than that of the ordinary squirrel cage, but less than that of motors with a single high resistance squirrel cage winding.

Typical slip for a standard induction motor in which a high starting torque is not required, may be less than five (5) percent. High slip motors such as used for overcoming the at-rest inertia of heavy loads range from eight (8) to thirteen (13) percent. High slip motors have high starting torque. They are designed for use where frequent or protracted starting under heavy loads is required. The high—8 to 13%—running slip and varying speed characteristics qualifies these motors for drives with high inertia. Some embodiments of the direct drive electric traction motors may employ high slip motors.

Figure 13:
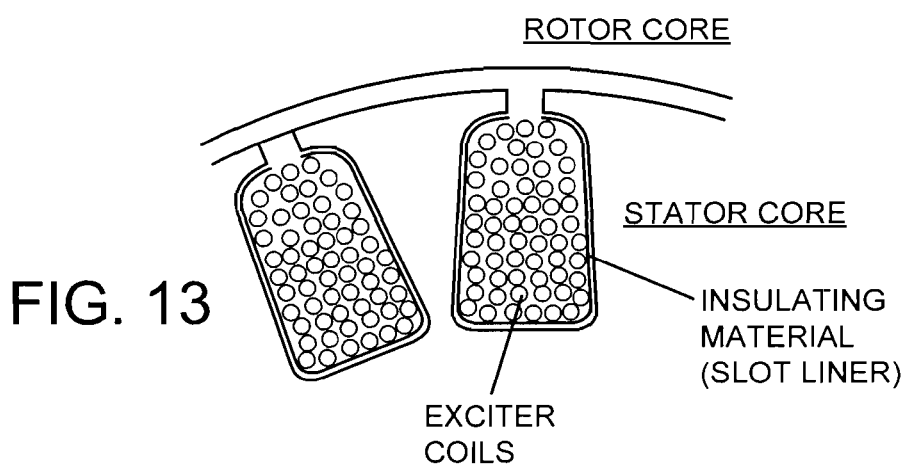
FIGS. 13 and 14 illustrate exemplary embodiments of the rotor and stator of an inside stator motor configuration for a three-phase squirrel cage motor.
Figure 14:
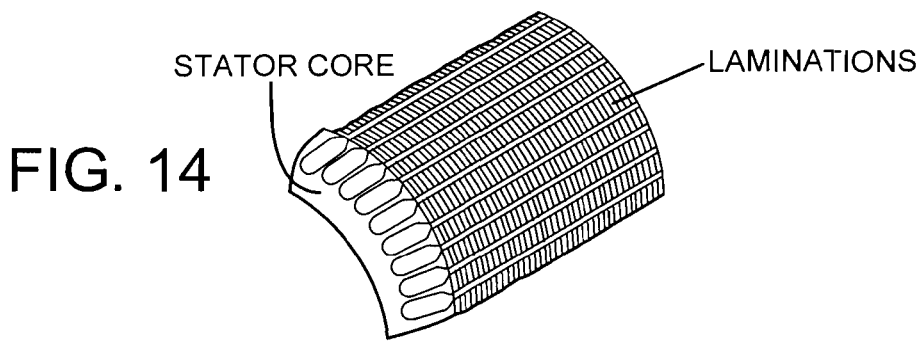

In a three-phase squirrel cage motor, the core of the rotor may be constructed of steel laminates. The material is usually the same as used in the stator. There can be less laminates, and they can be thicker, without producing excessive eddy current and hysteresis losses. This is due to the low frequency of the rotor's magnetic flux. FIGS. 13 and 14 illustrate exemplary embodiments of an inside stator motor configuration. FIGS. 13-14 depicts an exemplary arrangement of the stator coils which may be utilized in the motor configuration of FIG. 8. FIG. 14 is an enlarged view of a fragment of the stator.

Slots in the rotor are normally arranged in a diagonal fashion, or skewed. This minimizes the noise due to the magnetizing forces and smoothes the torque variations. The number of slots is typically not the same as the number of stator slots. There may be more or less slots on the rotor, but the number is preferably not an equal multiple or division of the number of stator slots, to prevent dead spots or points of zero torque.

Rotor conductors may be of various shapes, e.g. round, square, or rectangular. They may be made of conductive materials such as copper, aluminum or brass. The rotor conductors are inserted in to the slots of the core and are not typically insulated from the core. Insulation is not necessary since the induced voltage is seldom greater than 10 volts, and in most cases, considerably less. End rings complete the circuits for the rotor's conductors. They are generally made of the same material as the conductors.

Due to the large temperature change between no-load and full-load conditions, a good electrical connection is made between the conductors and the end rings. Rotor bars are usually welded, brazed or bolted to the end rings in order to achieve this condition. On small motors, the assembled rotor core may be placed in a mold and molten conductive material poured into the mold to make the conductors. Aluminum is a typical choice for these conductors when this process is used. The mold may also include provisions for cooling fans. Any openings between the rotor conductor bars and the end rings results in high resistance and heating.

In wound rotor motors, the rotor winding includes insulated coils of wire that are not permanently short-circuited, but may be connected in regular succession to form a definite polar area having the same number of poles as the stator. The ends of these rotor windings are brought out to collector rings, or slip rings, as they are commonly termed.

The currents induced in the rotor are carried by means of slip rings (and a number of carbon brushes riding on the slip rings) to an externally mounted resistance which can be regulated by a special control. By varying the amount of resistance in the rotor circuit, a corresponding variation in motor characteristics can be obtained. Thus, by inserting a high resistance in the rotor circuit at starting, a high starting torque can be developed with a low starting current. As the motor accelerates to full speed, the resistance is entirely cut out and the rotor windings are short-circuited.

Induction motor speed change methods include change in frequency, change in number of stator poles, and change in rotor slip. The frequency change method operates within limits. The motor is designed for power supply limitations, using such motor parameters as the laminations and winding design. The inductive reactance of the motor is determined by the frequency and inductance of the winding. The laminations or core and the number of turns determine the inductance and thus the inductive reactance. The inductive reactance has a bearing on how the current will be limited. Excess current causes heat; this heating can take place in a very short time.

Resistance and inductance are not variable; they are fixed by design. Rotor resistance is usually less than one (1) ohm. The exact value depends on the material and the physical characteristics of the conductors (length and cross-section). Inductance can be changed by using slots of different dimensions. A deep slot produces greater inductance than a shallow slot.

Brushless DC Motor

The term "brushless DC motor" is a misnomer, and typically refers to an AC synchronous motor, with rotor position feedback providing the characteristics of a DC shunt motor when looking at the DC bus. It is mechanically different from the brushed DC motor in that there is no commutator and the rotor is made up of laminations with a series of discrete permanent magnets inserted in the periphery. In this type of machine, the field system is provided by the combined effects of the permanent magnets and the armature reaction. Similar in principle to the synchronous motor, the rotor of this machine is fitted with permanent magnets that lock on to a rotating magnetic field produced by a stator. The rotating field is generated by an alternating current, and in order to vary the speed, the frequency of the supply is changed. Controllers based on inverter technology and pulse width modulation (PWM) may be used.

Figure 15:
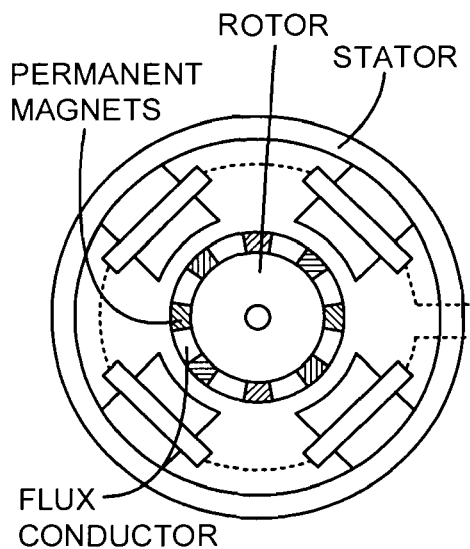
FIG. 15 is a simplified diagrammatic illustration of an exemplary embodiment of a brushless DC motor configuration with an outside stator configuration.
Figure 16:
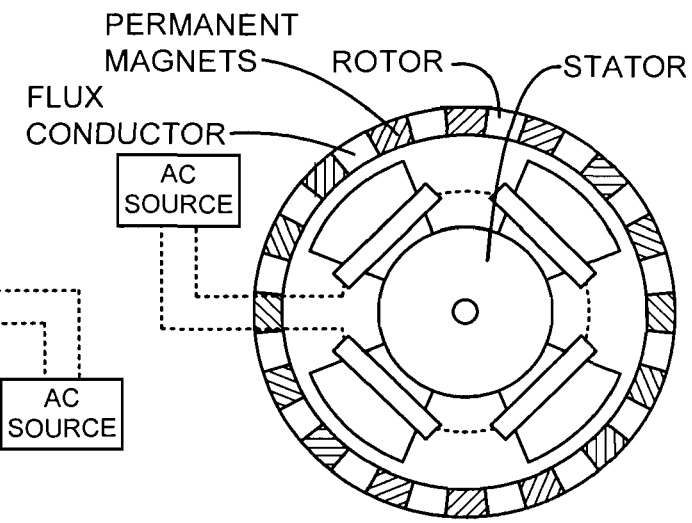
FIG. 16 is a simplified diagrammatic illustration of an exemplary embodiment of a brushless DC motor with an outside rotor configuration.

FIGS. 15 and 16 illustrate respectively two exemplary configurations of a brushless DC motor. FIG. 15 diagrammatically depicts an exemplary configuration of an inside rotor, outside stator motor. FIG. 16. diagrammatically depicts an exemplary configuration of an inside stator, outside rotor motor.

A step-motor like permanent magnet machine has a relatively high pole number and is built in such a way that its active radius is as large a fraction of its outer diameter as possible. These features make this geometry suitable for relatively low-speed applications as traction motors for buses and automobiles.

The rotor is the outermost element. A row of permanent magnets is mounted on the inside of the outer shell which forms the magnetic return path as well as the shaft. The magnets are alternately polarized. The machine stator includes a number of poles different (usually smaller) than the number of magnets. Wound on these poles, one coil per pole, is a multiple-phase armature winding. The required number of armature phases may be greater than three; e.g., a 12-pole (six-phase) stator winding and a 14-pole rotor.

Switched Reluctance Motor

The switched reluctance motor is a doubly salient pole machine with phase coils mounted around diametrically opposite stator poles. Salient poles are opposing 2-pair sets of stator or field poles that are concentrated in a confined arc of a circle and are enwrapped by the winding. Energizing a phase will cause the rotor to move into alignment with the stator poles in order to minimize the reluctance of the magnetic path. Simple but inherently reliable construction is one advantage of switched reluctance motors. For example, only steel laminations assembled on a shaft comprise the rotor, with no windings or cage as in AC induction and brushed DC motors.

Performance advantages include high speed capability, efficiency over a wide speed/torque range, excellent heat and vibration tolerance, and high power density. Because the rotor is passive (it does not use energizing coils or permanent magnets), total energy input is reduced compared to other electric motor designs.

Switched reluctance motors use controlled magnetic attraction in an exemplary 6/4 arrangement to produce torque. A 6/4 arrangement has 6 energized salient stator field poles and 4 non-energized salient rotor poles. Typical switched reluctance motors drives are unipolar, in that the voltages applied to the windings are of only one polarity. This is done to avoid shoot through problems in the power devices of the inverter. The 6/4 machine has a torque/speed curve similar to a DC series motor with a 4:1 constant power operating region.

Switched reluctance motors rely on control electronics to switch stator phases to produce a moving magnetic field. Rotor position feedback information may be employed to precisely time stator current pulses to maximize torque production.

Figure 17:
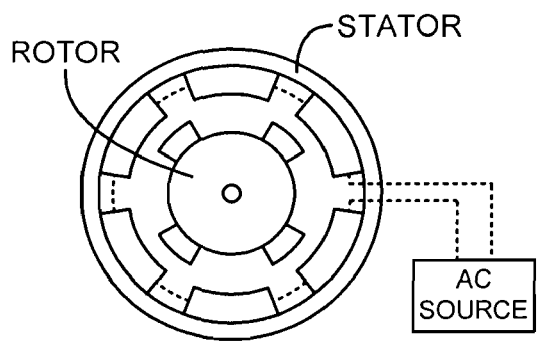
FIGS. 17-20 depict exemplary embodiments of switched reluctance motors.
Figure 18:
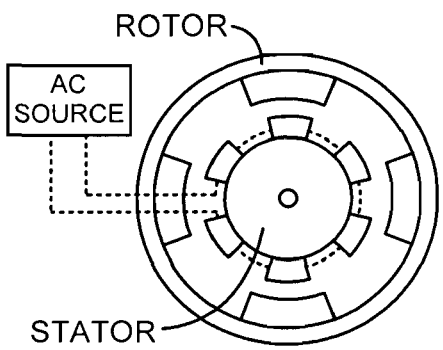
Figure 19:
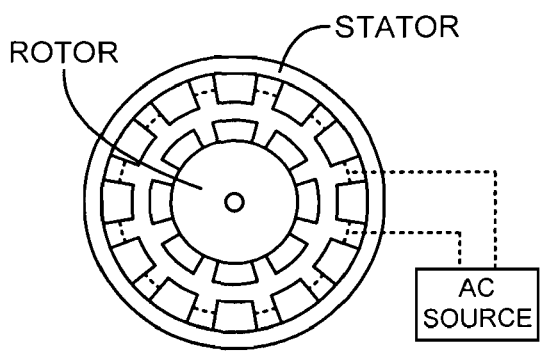
Figure 20:
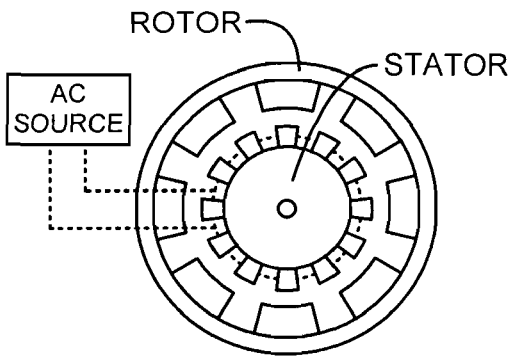

FIGS. 17-20 depict exemplary embodiments of switched reluctance motors. FIG. 17 depicts an exemplary configuration of a stator outside, 6/4 switched reluctance motor, i.e. a motor with 6 energized salient stator field poles and 4 non-energized rotor poles. FIG. 18 depicts an exemplary configuration of a rotor outside, 6/4 switched reluctance motor. FIG. 19 depicts an exemplary configuration of a stator outside, 12/8 switched reluctance motor, i.e. a motor with 12 energized salient stator field poles and 8 non-energized rotor poles. FIG. 20 depicts an exemplary configuration of a rotor outside, 12/8 switched reluctance motor.

In the embodiments of FIGS. 17-20, the energized stator salient poles create polar magnetic fields. The non-energized rotor salient poles respond to the stator poles by rotating to align with the stator poles such that the flux linking the stator pole with the rotor pole produces the least value of magnetic reluctance. This is similar to bringing a permanent magnet in close proximity to a non-magnetized nail and the nail is induced to move to the magnet; the nail is not restrained by an air gap and thus attaches itself to the permanent magnet. The reluctance of the nail is then zero. With an air gap restraint for the reluctance motor, the reluctance is merely minimized. Timely switching of the stator salient pole field polarity forces the rotor to continue to rotate as it attempts to move to a position of minimum magnetic reluctance.

8/12 switched reluctance motors, i.e. an arrangement with 8 energized salient stator field poles and 12 non-energized rotor poles, may be employed, with much smoother operation. This doubles copper utilization and increases output torque. It also uses a 3-phase bridge inverter. Switched reluctance motors are excellent for use in hostile environments and may be useful in heavy traction, where permanent magnet cost may preclude brushless DC motors.

Motor losses inherent to specific motor designs may be reduced by use of various techniques. For example, eddy current losses may be reduced by laminating the stator pole pieces. Hysteresis losses may be reduced by using silicon steel for the core or pole pieces. Flux linkage losses may be reduced when the air gap between rotor and stator is smallest.

FIGS. 9, 10, 11, 12 and 15-20 depict various motor types that can be used in exemplary embodiments of a direct drive vehicle traction motor. For comparison of the motor types, these are depicted as salient pole configurations, but may alternatively be constructed with round cylindrical rotors, exemplary features of which are depicted in FIGS. 11A, 12A, 13 and 14. An exemplary induction motor configuration with round cylindrical rotors is a preferred induction motor option for the application of the direct drive traction motor drive to heavy goods tractor-trailer trucks. For smaller wheeled vehicles, either an induction motor or a brushless DC motor using permanent magnets may be preferred motor configurations, both incorporating round cylindrical rotors.

Controllers

Solid state reduced-voltage starters may be used to provide smooth, stepless acceleration in three-phase induction motors. Integrated circuit logic devices provide further control options for such situations as over-temperature control.

Figure 21:
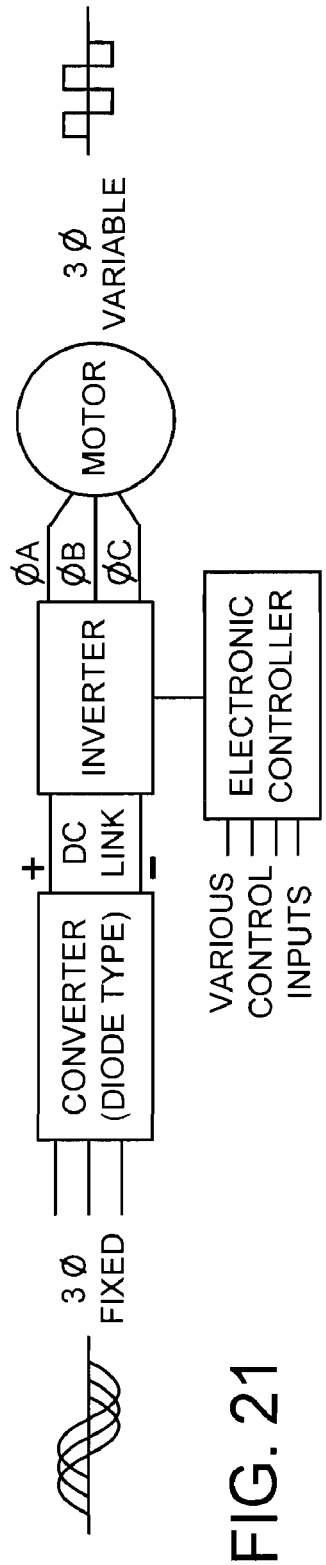
FIG. 21 is a simplified schematic block diagram of a three-phase adjustable frequency inverter AC motor drive controller.

Adjustable frequency (solid state) controllers for AC drives are commonly called inverters. They are typically available in a range of fractional to 1,000 horsepower. While previously designed to operate AC induction motors, they may also be adapted to control a direct drive traction motor drive system for vehicles. FIG. 21 is a schematic block diagram of an exemplary embodiment of an adjustable frequency AC motor drive controller. The 3-phase AC voltage signal from the vehicle alternator, for example, is converted to DC by a converter. The DC voltage is applied to an adjustable frequency inverter, controlled by an electronic controller, which receives control signals, e.g. from the driver accelerator, braking, etc., and drives the direct drive traction motor with a generated 3-phase, variable frequency drive signal.

Figure 22:
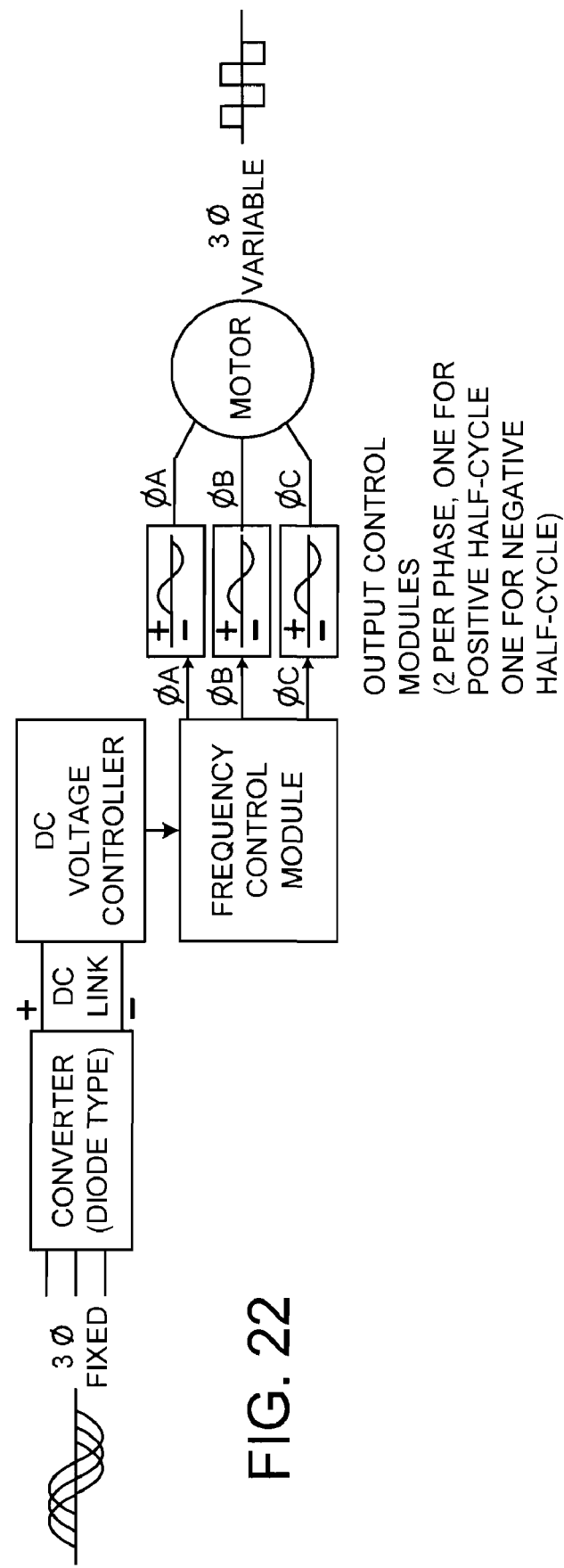
FIG. 22 is a simplified schematic block diagram of a three phase, pulse width modulation motor drive.

Another type of drive system suitable for use in a direct drive electric traction motor application employs pulse width modulation (PWM). FIG. 22 is a simplified schematic block diagram of such a drive system. The voltage output by the system is a series of DC pulses that is stepped to produce a "staircase" approximation of a sine wave of the desired frequency to control motor speed. Thus, the 3-phase output from the vehicle alternator, for example, is converted to DC by a converter. The frequency control module typically drives the output DC voltage control modules. There are two of these DC voltage control modules for each of the three phases; one controls the positive half cycles and the other controls the negative half cycles of the same phase. Six output modules are employed for three phases. PWM motor controllers are described, for example, in "Electricity 4, Motors, Controls, Alternators, Fifth Edition, Walter N. Alerich and Jeff Keljik, Delmar Publishers Inc., 1991, at pages 151-154.

When connected to a motor, the stepped output wave form may approximate a sine wave because of the motor's inductance. The frequency of the drive signal determines the speed of the motor in conjunction with the set number of poles.

Figure 23:
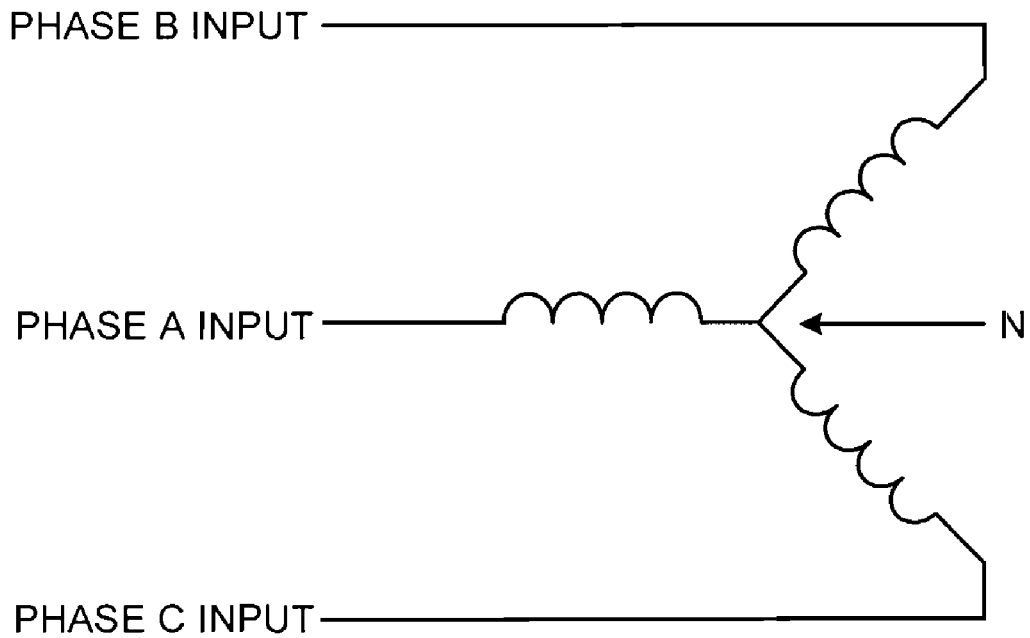
FIG. 23 schematically illustrates an exemplary connection of the three phases of a three-phase stator winding at a common node in a wye connection.
Figure 24:
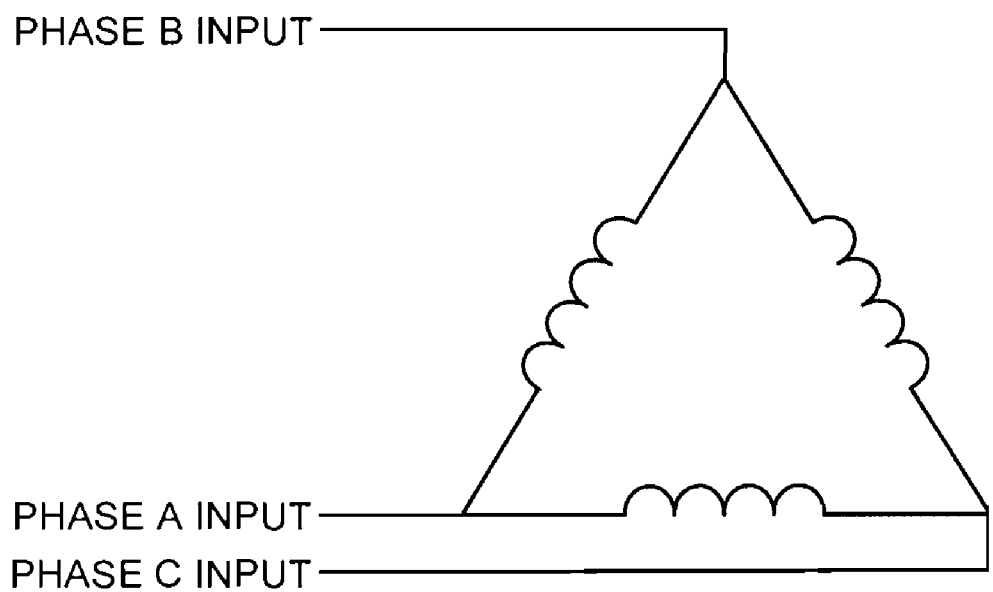
FIG. 24 illustrates an exemplary connection of the three phases of a three-phase stator winding in a "delta" connection.

The three phases of a three-phase stator winding may typically be connected in one of two ways: The three phases from the external three-phase power source may be connected at a common node N, called the "neutral point," as depicted in FIG. 23. This may be termed a 3-phase wye or star connection. In another alternative, each stator winding of the three phases may be connected to the windings of a different phase in a "delta" connection, and the three junction points connected to the external three-phase power source, as depicted in FIG. 24.

If an induction motor is wired as a wye or star connected stator winding, the input current to each phase is ⅓ of the total power source input current. This may be beneficial as an aid to limiting phase current at startup. Moreover, the wye connection may not contain third or multiples of three harmonic-induced currents, because the three phase signals cancel out. This may be beneficial because under certain conditions, as harmonic signal generation can be detrimental to the operation of the induction motor. Therefore, a wye-connected stator may be preferred for an exemplary embodiment of a direct drive traction motor system employing an induction motor system.

Programmable controllers may be employed to control the operation of the direct drive traction motor. A programmable controller may include a microprocessor that contains instructions and makes decisions, an input/output section that connects the input/output of the processor to the control devices, and a program used to provide the instructions and the decision tree used by the microprocessor.

Vehicle Applications

Exemplary vehicle applications include a heavy goods vehicle, such as a truck, typically in the United States, an eighteen-wheel tractor and trailer combination. The drive wheels with tires in an exemplary US tractor and trailer may be approximately 39 inches in diameter, giving 683 rpm at 80 mph. Another exemplary vehicle application is for a passenger vehicle. All motor types, including brushless DC, induction, switched reluctance and brushed DC, are viable motor types for the vehicle applications. Cost and maintenance factors are considerations in selecting a particular motor design. Brushed DC motors have significant maintenance needs, and are subject to greater levels of performance interruption. Brushless DC motors are subject to volume availability and high cost for permanent magnets. Switched reluctance motors are subject to electronic complexity and cost. The induction motor system may be particularly advantageous for adaptation to the application in a direct traction motor system for vehicles is the induction motor. One exemplary induction motor suitable for use is a three phase, pulse width modulation (PWM) controlled electric motor with interior stator and outside rotor configuration. An exemplary embodiment of such a motor configuration is illustrated in FIG. 12, with an exemplary embodiment of a motor drive circuit as illustrated in FIG. 22, for example.

Other exemplary applications for a direct drive traction motor include bicycles, wheelchairs, scooters, passenger and sport utility vehicles, including vehicles with hybrid (engine-electric) and electric only (motor and battery or fuel cell, without an internal combustion engine), propulsion systems.

Although the foregoing has been a description and illustration of specific embodiments of the invention, various modifications and changes thereto can be made by persons skilled in the art without departing from the scope and spirit of the invention as defined by the following claims.

What is claimed is:

1. A direct drive traction vehicle motor system for a wheeled vehicle including a vehicle wheel removably attachable to a vehicle axle hub by a wheel mounting structure, the motor system comprising:
    a passive electric motor rotor for mechanical attachment to the wheel mounting structure for rotational movement with the vehicle wheel;
    an attachment structure for concentrically mounting the rotor in a fixed relation to the vehicle wheel, the attachment structure including the wheel mounting structure;
    an active electric motor stator mounted in a concentric relationship with the rotor;
    a mechanical structure coupled between the vehicle and the stator for inhibiting rotation of the stator;
    an electric drive circuit electrically coupled to the motor stator for exciting the motor stator to impart a rotational force on the vehicle wheel through the rotor;
    wherein an electromotive force is applied to the wheel by the rotor without any use of reduction gearing; and
    wherein said wheel mounting structure includes lug bolts and lug nuts, and said rotor includes a hub portion with a bolt opening pattern, the rotor mechanically attached relative to the wheel by mounting of the rotor on said lug bolts and securing of said lug nuts on the lug bolts, and wherein said attachment structure comprises said lug bolts, said lug nuts and said hub portion.

2. The motor system of claim 1, wherein said vehicle wheel is a non-steerable wheel.

3. The motor system of claim 1, wherein said vehicle wheel is a steerable wheel.

4. The motor system of claim 1, further comprising a bearing system for coupling the stator to the rotor for maintaining a concentric relationship between the rotor and the stator while allowing relative rotational movement between the rotor and the stator.

5. The motor system of claim 1, wherein the mechanical structure coupled between the vehicle and the stator for inhibiting rotation of the stator comprises a strut member.

6. The motor system of claim 1, wherein the mechanical structure coupled between the vehicle and the stator for inhibiting rotation of the stator comprises a structure adapted to permit relative movement between the stator and a vehicle body member.

7. The motor system of claim 6, wherein said mechanical structure comprises a telescoping structure mounted between the vehicle body member and said stator.

8. The motor system of claim 6, wherein said mechanical structure comprises a slide structure.

9. The motor system of claim 1, wherein said the mechanical structure coupled between the vehicle and the stator for inhibiting rotation of the stator comprises an arm attached mechanically between a vehicle axle carrying the vehicle wheel or a vehicle suspension unit.

10. The motor system of claim 1, wherein the vehicle includes an internal combustion engine, and the motor system acts as an alternate or supplemental motive power source for the vehicle.

11. The motor system of claim 1, wherein the vehicle includes an electrical generator or alternator to generate electrical power from the internal combustion engine and a vehicle battery, and said electrical drive circuit receives electrical power generated by said electrical generator or alternator or said battery.

12. The motor system of claim 1, further comprising an adaptor plate structure disposed between the rotor and the vehicle axle.

13. The motor system of claim 1, wherein said hub portion further includes a stator axle protruding there from concentric to the vehicle axle, and the stator is mounted to said stator axle through a stator bearing assembly permitting relative rotation between the stator axle and the stator.

14. The motor system of claim 1, wherein said mechanical structure is adapted to support electrical cabling connected to said stator and said electrical drive circuit.

15. The motor system of claim 1, wherein said rotor, said stator and said electrical drive circuit are adapted to function as an induction motor system.

16. The motor system of claim 1, wherein said induction motor system is a three phase motor system with interior stator and outside rotor configuration.

17. The motor system of claim 15, wherein induction motor system is a squirrel cage motor system.

18. The motor system of claim 17, wherein said squirrel cage motor system is a double squirrel cage winding system.

19. The motor system of claim 1, wherein said rotor, said stator and said attachment structure are adapted to retrofit to a vehicle without modification of the vehicle wheel.

20. The motor system of claim 1, wherein said wheel has a nominal rim diameter of 22½ inches or 24½ inches.

21. A direct drive traction vehicle motor system for a vehicle including a vehicle wheel removably attachable to a vehicle axle hub by lug bolts and lug nuts, the motor system comprising:
    a passive electric motor rotor for mechanically attachment to the vehicle wheel and axle hub by use of the lug bolts and lug nuts;
    the rotor including a hub portion with a hole mounting pattern adapted to receive the lug bolts therethrough to concentrically mount the rotor relative to the vehicle wheel;
    an electric motor stator mounted in an interior concentric relationship with the rotor by a bearing arrangement;
    a mechanical structure for inhibiting rotation of the stator;
    an electrical wiring connection to the stator for delivering excitation electrical drive signals to the stator; and
    wherein an electromotive force is applied without any use of reduction gearing to the wheel by the rotor in response to electrical excitation of the stator.

22. The motor system of claim 21, wherein the rotor includes a rotor core and a set of permanent magnets mounted in the rotor core.

23. The motor system of claim 21, wherein the rotor includes a rotor core and a set of winding conductor bars.

24. The motor system of claim 21, wherein induction motor system is a squirrel cage motor system.

25. The motor system of claim 23, wherein said squirrel cage motor system is a double squirrel cage winding system.

26. A direct drive traction vehicle motor system for a wheeled vehicle having at least two axles, each axle with at least two wheels mounted on the axle by a wheel mounting structure including respective hubs and lug bolts, the motor system comprising:
    first and second electric motor rotors, each for mechanically attachment to one of said at least two wheels by use of said wheel mounting structure for rotational movement with the vehicle wheel;
    first and second attachment structures each for concentrically mounting one of said rotors to one of said vehicle wheels, the attachment structure including said wheel mounting structure with the respective hubs and lug bolts;
    first and second active electric motor stators each mounted in a inner concentric relationship with a corresponding one of the first and second rotors by a bearing arrangement;
    first and second stator rotation inhibiting mechanical structures, each coupled between the vehicle and a corresponding one of the first and second stators for inhibiting rotation of the stator;
    an electric drive circuit electrically coupled to the first and second motor stators for exciting the motor stators to impart rotational forces on the vehicle wheels through the rotors; and
    wherein an electromotive force is applied to the first and second wheels by the first and second rotors without any use of reduction gearing.

27. The motor system of claim 26, wherein said first and second vehicle wheels are non-steerable wheels.

28. The motor system of claim 26, wherein said first and second vehicle wheels are steerable wheels.

29. The motor system of claim 26, further comprising a bearing system for coupling the stator to the rotor for maintaining a concentric relationship between the rotor and the stator while allowing relative rotational movement between the rotor and the stator.

30. The motor system of claim 26, wherein the vehicle includes an internal combustion engine, and the motor system acts as an alternate or supplemental motive power source for the vehicle.

31. The motor system of claim 26, wherein the vehicle includes an electrical generator or alternator to generate electrical power from the internal combustion engine and a vehicle battery, and said electrical drive circuit receives electrical power generated by said electrical generator or alternator or said battery.

32. The motor system of claim 26, wherein said rotor, said stator and said electrical drive circuit are adapted to function as an induction motor system.

33. The motor system of claim 26, wherein said induction motor system is a three phase motor system with interior stator and outside rotor configuration.

34. The motor system of claim 33, wherein induction motor system is a squirrel cage motor system.

35. The motor system of claim 34, wherein said squirrel cage motor system is a double squirrel cage winding system.

36. The motor system of claim 26, wherein said rotor, said stator and said attachment structure are adapted to retrofit to the vehicle without modification of the vehicle wheel.

* * * * *